United States Patent [19]

Okada et al.

[11] Patent Number: 5,128,857
[45] Date of Patent: Jul. 7, 1992

[54] SEQUENCE CONTROL APPARATUS HAVING SEPARATE SEQUENCE MEMORY AND INTERLOCK CONDITION MEMORY

[75] Inventors: Masahiro Okada, Chiryu; Masahiro Sugiura, Anjo; Satoru Kamoshita; Kazuyoshi Koumura, both of Okazaki, all of Japan

[73] Assignee: Fuji Machine Mfg. Co., Ltd., Japan

[21] Appl. No.: 575,493

[22] Filed: Aug. 30, 1990

[30] Foreign Application Priority Data

Sep. 1, 1989 [JP] Japan .................. 1-228148

[51] Int. Cl.⁵ .............................................. G06F 15/46
[52] U.S. Cl. ........................... 364/140; 364/141; 364/189; 364/474.16; 364/474.22
[58] Field of Search .................. 364/140, 141, 474.16, 364/474.19, 474.22, 188, 189, 186, 187; 340/309.4, 309.5

[56] References Cited

U.S. PATENT DOCUMENTS

| | | | |
|---|---|---|---|
| 3,903,515 | 9/1975 | Haydon et al. | 340/309.4 |
| 4,535,456 | 8/1985 | Bauer et al. | 364/141 |
| 4,858,102 | 8/1989 | Lovrenich | 364/474.16 |

FOREIGN PATENT DOCUMENTS

| | | |
|---|---|---|
| 2248545 | 5/1975 | France. |
| 2393766 | 1/1979 | France. |
| 2028539 | 3/1980 | United Kingdom. |

*Primary Examiner*—Jerry Smith
*Assistant Examiner*—Paul Gordon
*Attorney, Agent, or Firm*—Oliff & Berridge

[57] ABSTRACT

A sequence control apparatus including a counter which sequentially designates memory areas of a sequence memory to read out respective sets of operation commands to represent respective events of operation of a controllable device. The counter also sequentially designates memory areas of an interlock condition memory to read out respective sets of interlock conditions that should be satisfied for the corresponding events of operation to be performed. When each event of operation is completed, the counter is incremented or decremented, and the conditions of the controllable device are checked to determine whether the set of interlock conditions for the currently designated event of operation are satisfied.

17 Claims, 12 Drawing Sheets

FIG. 7

| BACKUP RAM | ~120 |
|---|---|
| SEQUENCE COUNTER | ~22 |
| SEQUENCE MEMORY | ~24 |
| INTERLOCK CONDITION MEMORY | ~26 |
| SKIP CONDITION MEMORY | ~122 |

SEQUENCE CONTROL APPARATUS HAVING SEPARATE SEQUENCE MEMORY AND INTERLOCK CONDITION MEMORY

BACKGROUND OF THE INVENTION

1. Field of the Invention

The present invention relates to a sequence control apparatus for generating a plurality of operation commands for performing respective events of operations in a predetermined sequence on a controllable device, and more particularly to an arrangement for improvement in the flexibility or versatility of such a sequence control apparatus whose major portion is constituted by a computer.

2. Discussion of the Prior Art

A large number of actuators are used in a machining line which includes a machine tool, a work supply device, a work loading/unloading device and a work delivery device. For automatically controlling such a machining line as a controllable device having many controllable actuators to perform a series of operations, appropriate operation commands must be sequentially applied to the actuators in the predetermined order. For this purpose, a sequence control apparatus is usually employed. The sequence control apparatus is not adapted merely for generating the operation commands in the predetermined sequence, but is required to check the operating conditions of various components of the controllable device that are driven or operated by the actuators, in order to assure the desired sequential operations without interference of the operating components with each other. In other words, the sequence control apparatus is required to start each actuator only after the specific condition for permitting a normal operation of the actuator is satisfied. Further, even after the actuator is started, it is necessary to interrupt the operation of the actuator if there arises any abnormality that prevents the normal operation of the actuator. That is, a certain condition should be satisfied during the operation of the actuator. The former condition is referred to as "start condition" which should be satisfied to start an actuator, and the latter condition is referred to as "continuing condition" which should be satisfied for the actuator to continue its operation. These start and continuing conditions are collectively referred to as "interlock condition".

Recently, a computer is utilized as a major portion of a sequence control apparatus as described above. The computer functions to determine the order in which a plurality of actuators of a controllable device are activated, and monitor the operating conditions of the controllable device for checking whether the appropriate interlock conditions are satisfied for the respective actuators. The sequence control apparatus using a computer is easier and economical to manufacture, than a hard-wired sequence controller which utilizes many relays.

However, a computer-aided sequence control apparatus requires different control programs adapted for exclusive use for different types or configurations of the controllable device. The preparation of the exclusive control programs requires a considerable time. Further, the control program for a given controllable device should be modified if the events of operations to be performed or the interlock conditions for the operations are changed. While the modification of the control program is easier than the corresponding modification of the circuitry of a hard-wired sequence control apparatus, the modification of the control program requires considerable efforts of an expert programmer.

It is noted that the principle of the present invention is applicable not only to a device which includes an actuator or actuators for producing mechanical movements of movable components, but also to a device in which the components operate to perform a non-mechanical operation. In the present application, the term "operation" or "events of operation" should be broadly interpreted so as to encompass both the mechanical movements and the non-mechanical operation as indicated above.

In a computer-aided sequence control apparatus as described above, an operation of the controllable device is interrupted in the event the interlock condition for that operation is lost for some reason or other. In this case, the cause for the interruption should be located. However, it is difficult to locate the abnormality that causes the interruption of the operation. Namely, the operating conditions of the individual components of the controllable device should be checked against the relevant portion of the control program. This checking must be done by an expert who is versed in the control program, and requires large amounts of time and efforts.

For easy maintenance and inspection of the controllable device, it is desirable that the actuators of the controllable device be operable in a stepping mode by the operator using an operator's control unit. In view of this desire, the sequence control apparatus is generally provided with such an operator's control unit for permitting a manual stepping operation of the controllable device. In this case the operator's control unit has many operator-controlled switches, which are operated by the operator in a predetermined sequence. However, the operator is not usually thoroughly familiar with the predetermined sequence of operation, and must consult the operating manual for the correct stepping procedure. This also requires considerable time and efforts.

SUMMARY OF THE INVENTION

It is a first object of the present invention to provide a computer-aided sequence control apparatus which permits relatively easy preparation and modification of a control program.

A second object of the invention is to provide a sequence control apparatus which permits relatively easy diagnosis of the controllable device to locate a cause for interruption of an operation due to the loss of the interlock condition for the operation.

A third object of the invention is to provide a sequence control apparatus which is easily operable in a manual or stepping mode.

The first object may be achieved according to the principle of the present invention, which provides a sequence control apparatus for generating a plurality of sets of operation commands for performing respective events of operation in a predetermined sequence on a controllable device, comprising: (a) a counter whose count is changeable by a predetermined incremental or decremental amount; (b) sequence memory means having a plurality of memory areas which correspond to respective count values of the counter and which are arranged in the order of the respective count values, the memory areas storing the plurality of sets of operation commands, respectively; (c) interlock condition memory means having a plurality of memory areas corresponding to the respective count values of the counter, the memory areas storing a plurality of interlock conditions which should be satisfied for the respective events of operation to be performed; and (d) control means for changing the count of the counter by the predetermined amount when each of the events of operation is completed. The control means is adapted to read out from the sequence memory means one of the sets of operation commands which corresponds to the current count value of the counter, and read out from the interlock condition memory means one of the interlock conditions which corresponds to the one set of operation commands. The control means determines whether or not the read-out interlock condition is satisfied on the controllable device, and applies the read-out set of operation commands to the controllable device when the relevant interlock condition is satisfied. The control means inhibits the read-out set of operation commands from being applied to the controllable device when the interlock condition is not satisfied.

In the sequence control apparatus of the present invention constructed as described above, the plurality of sets of operation commands and the corresponding interlock conditions are stored in the corresponding memory areas of the sequence memory means and the interlock condition memory means, respectively, such that the memory areas correspond to the respective count values of the counter. Upon completion of each of the events of operation represented by the operation commands, the control means updates the content of the counter by the predetermined amount, usually, by incrementing or decrementing the count by "1", and retrieves from the sequence and interlock condition memory means the set of operation commands and the interlock condition which correspond to the current or updated count of the counter. The control means then determines whether or not the operating conditions of the controllable device satisfy the retrieved interlock condition, and applies the relevant set of operation commands to the controllable device if the interlock condition is currently satisfied. If not, the operation commands are not supplied to the controllable device, and the corresponding event of operation does not take place.

In the present sequence control apparatus, the operation commands and the interlock conditions are not incorporated in the associated control program as in a conventional sequence control apparatus, but are retrieved from the appropriate sequence memory areas of the sequence memory means and the interlock condition memory means, which memory areas are designated by the current count of the counter. In the present arrangement, the information (operation commands and interlock conditions) that should be changed with a change in the arrangement of the controllable device and/or a change in the events of operation to be performed are made independent of the control program, whereby it is not necessary, as a rule, to change or modify the control program when the controllable device is changed or the events of operation to be performed are changed.

Since the events of operation to be performed and the corresponding interlock conditions are well understood by a designer of the controllable device, the designer may prepare the operation commands representative of the events of operation and the data representative of the interlock conditions, without understanding the details of the relevant control program. The prepared operation commands and interlock condition data are merely stored into the respective sequence and interlock condition memory means.

Where it becomes necessary to change the events of operation and/or interlock conditions, all that has to be done to deal with the change is to change the contents of the sequence memory means and/or the interlock condition memory means. The control program itself need not be changed. Namely, the designer of the controllable device rather than the designer of the sequence control apparatus or programmer of the control program can relatively easily prepare or modify the necessary data to be stored in the sequence and interlock condition memory means. Thus, the present sequence control apparatus may be manufactured or modified in a reduced time and with reduced efforts.

According to one preferred form of the present invention, the sequence memory means is capable of storing, as a part of the operation commands, a conditional skip command for executing a conditional skip operation which consists of changing the count of the counter by an amount other than the predetermined incremental or decremental amount, if a predetermined skip condition is satisfied, and the interlock condition memory means stores skip condition data representative of the predetermined skip condition. Upon reading of the conditional skip command and the predetermined skip condition from the sequence memory means and the interlock condition memory means, the control means determines whether or not the skip condition represented by the skip condition data is satisfied on the controllable device. The control means executes the conditional skip operation if the skip condition is satisfied, and inhibits the conditional skip operation if the skip condition is not satisfied.

According to an alternative form of the invention, the sequence control apparatus further comprises skip condition memory means for storing skip condition data representative of a skip condition that should be satisfied for a conditional skip operation to be performed, and the sequence memory means is capable of storing as a part of the operation commands, a conditional skip command for executing the conditional skip operation which consists of changing the count of the counter by an amount other than the predetermined incremental or decremental amount. Upon reading of the conditional skip command and the skip condition data from the sequence memory means and the skip condition memory means, respectively, the control means determines whether or not the skip condition represented by the skip condition data is satisfied on the controllable device. The control means executes the conditional skip operation if the skip condition is satisfied, and inhibits the conditional skip operation if the skip condition is not satisfied.

In the above forms of the present invention, the conditional skip command may be stored in the sequence memory means, for performing a conditional skip operation as one of the events of operation to be performed on the controllable device. The skip condition that should be satisfied to perform the condition skip operation is stored in the skip condition memory means. The conditional skip operation is executed when the corresponding skip condition is satisfied. This conditional skip operation is useful for skipping some part of the series of operations to be performed on the controllable device, if the predetermined skip condition is satisfied. In other words, the predetermined events of operation can be changed, without changing the operation commands and the control program, depending upon whether or not the conditional skip operation is performed or whether or not the skip condition is satisfied. The conditional skip command is stored as part of the operation commands stored in the sequence memory.

The skip condition data representative of the skip condition may be stored either in the interlock condition memory means, or in the exclusive skip condition memory means. In the former case, the interlock conditions may be used as the skip conditions for the conditional skip commands. In the latter case, the skip condition memory means may have two or more memory areas which store respective different skip conditions. In this case, the memory areas are identified by identification numbers which are represented by skip condition designating data stored in the sequence memory as part of the operation commands. Namely, a set of operation commands for a conditional skip operation consists of the conditional skip command and the skip condition designating data which designates one of the memory areas from which the skip condition data is read out. According to this arrangement, the conditional skip operation may be performed under different conditions of the controllable device, even though the same conditional skip command is used. The skip condition for any conditional skip operation may be easily changed simply by changing the skip condition identification number, without changing the control program.

According to another preferred form of the invention, the sequence memory means is adapted to be able to store as a part of the operation commands an operation interrupt command for interrupting the events of operation on the controllable device. In this case, the control means interrupts the events of operation, upon reading of the operation interrupt command. In the conventional sequence control apparatus, it is very difficult and cumbersome to prepare a control program such that a series of operations is interrupted at a desired point, since the point of interruption must be selected with utmost cares in relation to the operations which precede and follow the interruption. According to the present form of the invention, the operation interrupt command may be easily inserted as part of a batch of operation commands stored in the sequence memory means.

The second object indicated above may be achieved according to a further preferred form of the present invention, wherein there is provided indicator means, which is responsive to the control means, for indicating the interlock condition which corresponds to the current count of the counter and which is not satisfied. Usually, the controllable device is stopped if the interlock condition for a given event of operation is not satisfied, since in this event the appropriate sets of operation commands are not applied to the controllable device. According to the present form of the invention, the indicator means indicates the interlock condition which is not satisfied. Since the relevant interlock condition is designated by the current count of the counter, the control means is easily enabled to command the indicator means to indicate the unsatisfied interlock condition. The operator who observes the indication may be instantly informed of the cause for the interruption of the series of operation, and may efficiently deal with the interruption. Thus, the downtime of the controllable device may be reduced, according to the present form of the sequence control apparatus, as compared with the conventional apparatus in which the cause for the interruption can be located by an expert service engineer, usually with considerable time and difficulty.

The indicator means may be a liquid crystal display which provides characters indicative of the interlock condition which is not satisfied on the controllable device. In the case where the controllable device includes a plurality of actuators which are activated to perform the respective events of operation according to the respective sets of operation commands, the sequence control apparatus may further comprise: an operator's control unit having a plurality of operator-controlled switches for operating the plurality of actuators, respectively; a plurality of indicator lights disposed for the plurality of operator-controlled switches; and indicator control means which activates one of the indicator lights which corresponds to one of the operator-controlled switches, when the interlock condition for an event of operation performed by the actuator operated by the above-indicated one operator-controlled switch is not satisfied. In this case, the indicator control means cooperates with the indicator lights to serve as the indicator means.

The third object indicated above may be achieved according to a still further preferred form of the invention, wherein the controllable device includes a plurality of actuators each of which is activated to perform a corresponding one of the events of operation according to a corresponding one of the plurality of sets of operation commands, and the sequence control apparatus further comprises: a plurality of indicator lights corresponding to the plurality of actuators, respectively; operator-controlled stepping means for sequentially performing the events of operation one at a time each time the operator-controlled stepping means is operated, in at least one of a forward direction determined by a direction in which the events of operation are performed in the predetermined sequence, and a reverse direction opposite to the forward direction; and indicator control means for activating one of the indicator lights which corresponds to one of the plurality of actuators which is operated by operation of the operator-controlled stepping means, and thereby informing an operator of the sequence control apparatus of the actuator which is to be operated next.

In the above form of the invention, the operator is informed by the indicator lights of the actuators which are sequentially activated by the operator-controlled stepping means to perform the events of operation in either the forward or reverse direction. Thus, the operator may know the actuator which is operated next or the corresponding event of operation which is performed next by the following operation of the stepping means. Accordingly, the operator is not required to know the sequence in which the events of operation are to be performed. Namely, even the operator who is not familiar with the predetermined operation sequence of the controllable device may manually operate the controllable device with safety, while confirming each event of operation to be performed by each operation of the operator-controlled stepping means. In the present form of the invention, the sequence control apparatus may comprise an operator's control unit having a plurality of operator-controlled switches for selecting the plurality of actuators, respectively. The operator-controlled switches are provided with respective indicator lights.

According to a yet further form of the present invention, the controllable device includes a plurality of actuators each of which is activated to perform a corresponding one of the events of operation according to a corresponding one of the plurality of sets of operation commands, and the sequence control apparatus further comprises: an operator's control unit having a plurality of operator-controlled switches for operating the plurality of actuators; a plurality of indicator lights corresponding to the plurality of operator-controlled switches; first indicator control means for activating one of the indicator lights which corresponds to one of the operator-controlled switches if the interlock condition for the actuator activated by the above-indicated one operator-controlled switch is not satisfied on the controllable device; operator-controlled stepping means for sequentially performing the events of operation one at a time each time the operator-controlled switch is operated, in at least one of a forward direction in which the events of operation are performed in the predetermined sequence, and a reverse direction opposite to the forward direction; and second indicator control means for activating one of the indicator lights which corresponds to one of the plurality of actuators which is operated by operation of the operator-controlled stepping means, and thereby informing an operator of the sequence control apparatus of the actuator which is to be operated next, the first and second indicator control means activating the indicator lights in respective different manners.

According to another form of the invention, the controllable device includes a plurality of actuators each of which is activated to perform a corresponding one of the events of operation according to a corresponding one of the plurality of sets of operation commands, and the sequence control apparatus further comprises an operator's control unit having operator-controlled stepping means for applying the plurality of sets of operation commands one set at a time to perform the events of operation in the predetermined sequence. The operator's control unit further has indicator means for indicating one of the actuators which is activated next in response to an operation of the operator-controlled stepping means.

According to a further form of the invention, the plurality of memory areas of the interlock condition memory means store a plurality of sets of interlock conditions corresponding to the respective events of operation. Each memory area of the interlock condition memory means consists of a plurality of memory locations assigned to all operating conditions of the controllable device which cover the interlock conditions of all of the events of operation. Each memory location of each numbered memory area stores data indicative of whether or not the corresponding operating condition of the controllable device should be satisfied for the corresponding event of operation.

In a still further form of the invention, the sequence control apparatus further comprises: a current status memory which stores current status data indicative of current operating conditions of respective actuators of the controllable device which are activated to perform the events of operation, respectively; reset start means, operable while the controllable device is stopped part way through the events of operation in the predetermined sequence, for re-starting the events of operation from the current operating conditions represented by the current status data stored in the current status memory; and reset start control means responsive to the reset start means, for scanning the interlock condition memory means to determine one of the plurality of interlock conditions which coincides with the current operating conditions represented by the current status data, and updating the count of the counter to a value corresponding to the determined one interlock condition.

According to another form of the invention, the controllable device includes a plurality of actuators which are activated to perform the respective events of operation, respectively, and each of the plurality of interlock conditions consists of a start condition that should be satisfied to start a corresponding one of the events of operation, and a continuing condition that should be satisfied for the corresponding one event of operation to continue. In this instance, the control means includes determining means for determining, before starting of the corresponding one event of operation, whether or not the start condition is satisfied, and determining, after the starting, whether or not the continuing condition is satisfied.

According to still another form of the invention, the controllable device has a plurality of actuators which are activated to perform the respective events of operation, and each of the plurality of interlock conditions consists of a start condition that should be satisfied to start a corresponding one of the events of operation, and a continuing condition that should be satisfied for the corresponding one event of operation to continue. Each of the plurality of sets of operation commands stored in the sequence memory means includes an auxiliary command indicative of whether or not a plurality of the events of operation should be performed in parallel. In this case, the control means includes determining means for determining, until all of the plurality of events of operation are started, whether or not the corresponding start conditions are satisfied, and determining, after all events of operation are started, whether or not the corresponding continuing conditions are satisfied. In this case, each set of operation commands may be adapted to further include an operation code representative of a corresponding one of the events of operation, and the memory areas of the sequence memory means include a first group of successive memory areas which store respective sets of operation commands each of which includes the auxiliary command that indicates that events of operation represented by the respective operation codes should be performed in parallel, and a second group of successive memory areas following the first group, the second group of successive memory areas storing respective sets of operation commands which include the respective operation codes and which do not include the auxiliary command that indicates that the events of operation represented by the respective operation codes should be performed in parallel. The operation codes are stored in the second group of successive memory areas in an order in which the corresponding events of operation are completed. Upon reading of the operation commands from the first group of successive memory areas, the determining means of the control means determines whether or not the corresponding start conditions are satisfied, and upon reading of the operation commands from the second group of successive memory areas, determines whether or not the corresponding continuing conditions are satisfied.

The sets of operation commands stored in the sequence memory means may include a set of operation commands which includes an operation code for effecting a time measuring operation, and a command for designating a length of time to be measured by the time measuring operation.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 7 is a view showing a backup random-access memory used in a modified embodiment of the sequence control apparatus of the invention.

DETAILED DESCRIPTION OF THE PREFERRED EMBODIMENTS

Figure 1:
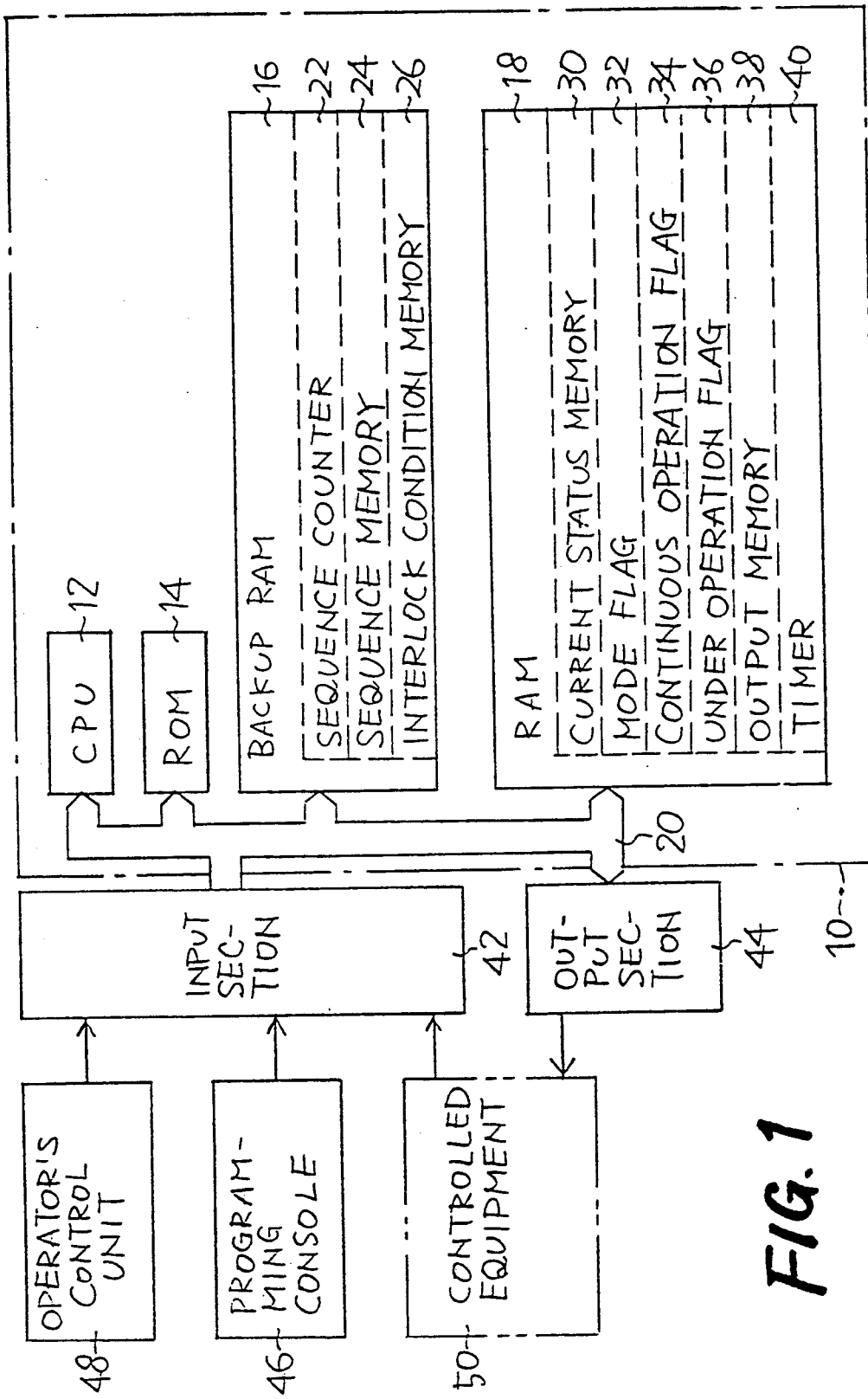
FIG. 1 is a block diagram showing one embodiment of a sequence control apparatus of the present invention.

Referring first to FIG. 1, there is shown a sequence control apparatus whose major portion consists of a computer 10. The computer 10 includes a central processing unit (CPU) 12, a read-only memory (ROM) 14, a backup random-access memory (RAM) 16, a random-access memory (RAM) 18, and a bus 20 which interconnects the elements 12, 14, 16 and 18. The ROM 14 stores a control program illustrated in the flow charts of FIGS. 2A and 2B. The backup RAM 16 is backed up by a backup battery, to retain stored data even when the control apparatus is turned off with power removed from the computer 10. The backup RAM 16 includes a SEQUENCE counter 22, a SEQUENCE memory 24 and an INTERLOCK CONDITION memory 26. The RAM 18, which is not backed up by a backup battery, includes a CURRENT STATUS memory 30, a MODE flag 34, an UNDER OPERATION flag 36, an OUTPUT memory 38 and a timer 40, as well as a working memory for temporarily storing data obtained as a result of arithmetic operations by the CPU 12.

Figure 3:
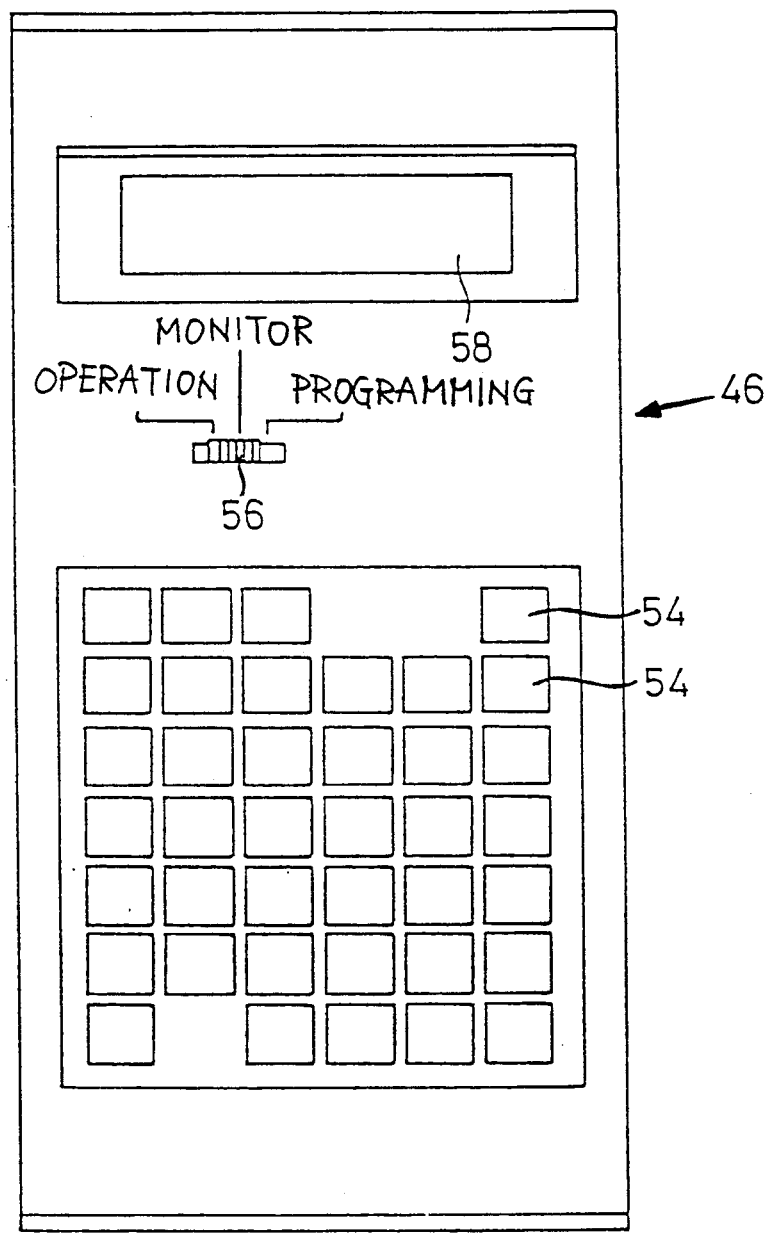
FIGS. 3 and 4 are front elevational views of a programming console and an operator's control unit shown in FIG. 1, respectively.
Figure 4:
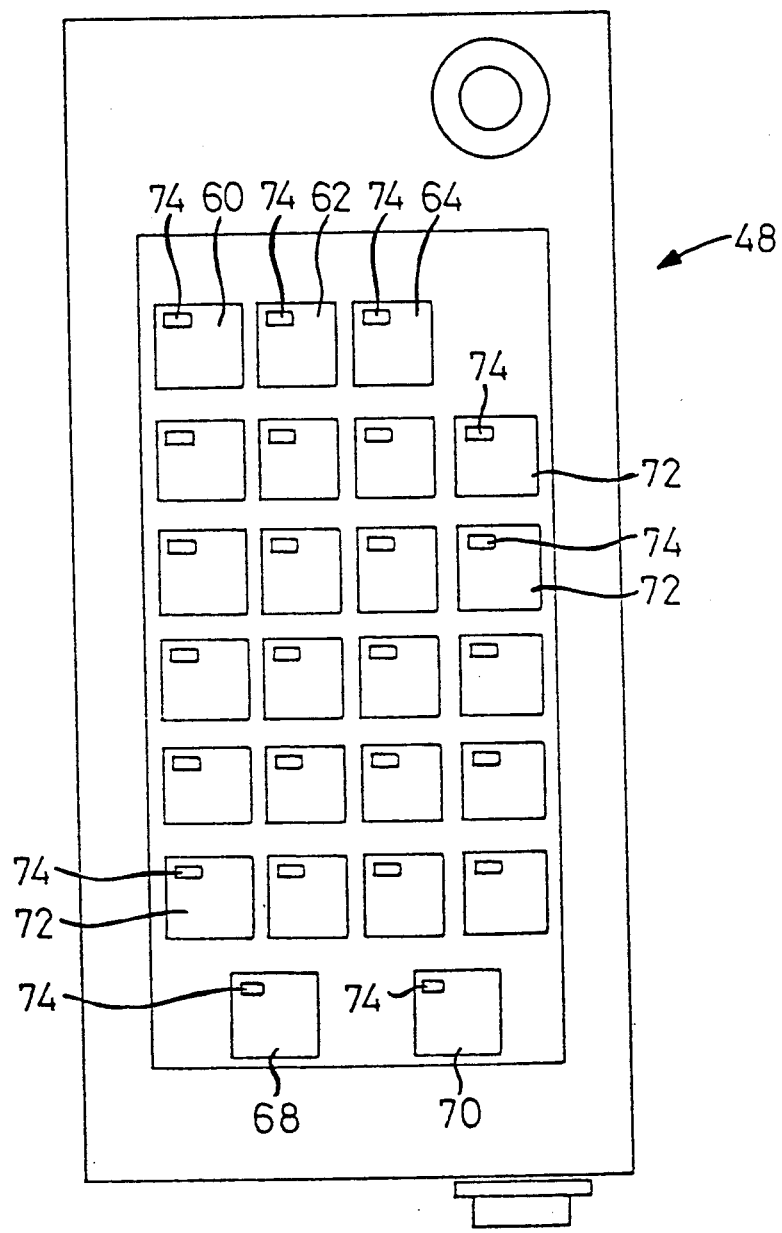

To the bus 20 of the computer 10, there are connected an input section 42 and an output section 44. The input section 42 is a hard-wired circuit arrangement adapted to receive external signals, such as output signals from a programming console 46 and an operator's control unit 46, and output signals from a controllable device in the form of an automatic machining line 50, which is controlled by the present sequence control apparatus. As shown in FIG. 3, the programming console 46 has a multiplicity of data entry key switches 54 for entering data, a MODE selector switch 56, and a liquid crystal display 58. The MODE selector switch 56 has three positions for selecting a PROGRAMMING mode, a MONITOR mode and an OPERATION mode, respectively. The operator's control unit 48 is disposed in parallel with a main control unit provided on the automatic machining line 50, i.e., controlled equipment 50. As shown in FIG. 4, the operator's control unit 48 has an ENABLE switch 60, a STEP MODE selector switch 62, a MANUAL MODE selector switch 64, a FORWARD INCREMENT switch 68, and a REVERSE DECREMENT switch 70, as well as a multiplicity of actuator selector switches 72. Each of these switches 60, 62, 64, 68, 70, 72 is provided with an indicator light 74.

Figure 5:
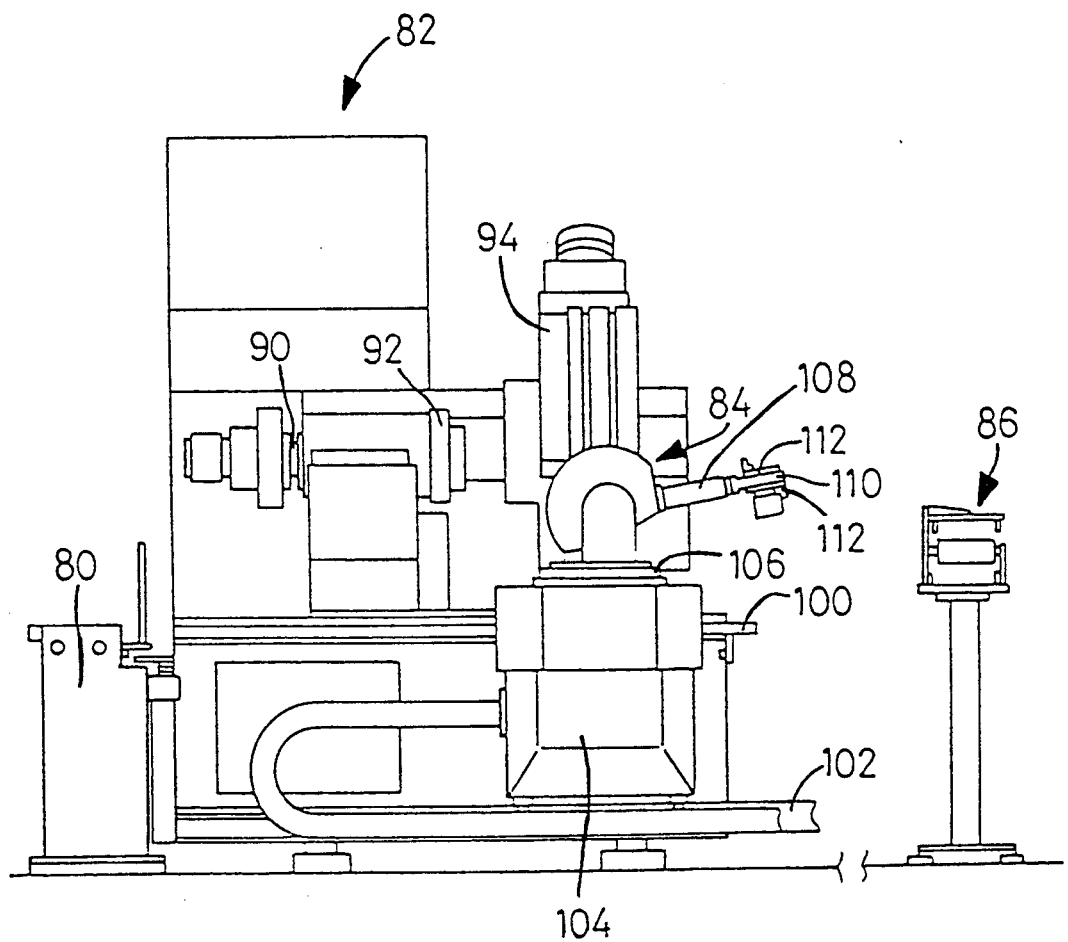
FIG. 5 is a front elevational view of a part of an automatic machining line as one example of equipment to be controlled by the sequence control device of FIG. 1.

An example of the controlled equipment or automatic machining line 50 that can be controlled by the present sequence control apparatus is illustrated in FIG. 5. This machining line 50 includes a work supply device 80 for supplying workpiece blanks one after another, a turning machine or lathe 82 for machining the workpieces, a work measuring device for measuring the dimensions of the machined workpieces, and a work loader 84 adapted to carry the unmachined or machined workpieces to and from the lathe 82, to and from the work measuring device, and to delivery the machine workpieces. The machining line 50 further includes a work delivery conveyer 86 for transferring the machined workpieces.

The turning machine or lathe 82 has a spindle 90, and a chuck 92 rotated by the spindle 90. The workpiece held by the chuck 92 is machined by cutting tools held on a cross slide 94 mounted on a carriage. The cross slide 94 is fed in a direction perpendicular to the rotation axis of the spindle 90, while the carriage is fed in the axial direction of the spindle 90, as well known in the art.

The work loader 84 has a carriage 104 which is slidably moved on a pair of guide rails 100, 102 in the axial direction of the main spindle 90, and a loader table 106 which is mounted on the carriage 104 such that the table 106 is rotatable about the vertical axis thereof. The loader table 106 carries a loader arm 108 which is pivotable or swingable about the horizontal axis thereof. The loader arm 108 has a loader head 110 at a free end thereof. The loader head 110 is rotatable about an axis parallel to the longitudinal direction of the arm 108. The head 110 has a pair of loader chucks 112 which are disposed back to back such that the two chucks 112 are concentric with each other. One of these two chucks 112 is brought into concentric alignment with the chuck 92 of the lathe 82, for example, by rotation of the loader head 110. The carriage 104 and the loader arm 108 are driven by respective servomotors, which are connected to the output section 44 through respective servo amplifiers and servo controllers. The loader head 110 is rotated by an induction motor, which is also connected to the output section 44. The chuck 92 of the lathe 82, loader chucks 112 are driven by respective hydraulic cylinders, while the loader table 106 is rotated by a hydraulic motor. Solenoid-operated control valves for controlling these hydraulic cylinders and motors are also connected to the output section 44. The machining line is equipped with air blower devices for blowing off cutting chips and a coolant from the workpiece and chucks 92, 112. Solenoid-operated control valves for controlling the air blower devices are also connected to the output section 44. The servomotors, induction motor and solenoid-operated control valves will be generally referred to as "actuators".

The input portion 42 receive output signals from various detectors such as limit switches for sensing operating conditions of various components, parts or devices of the machining line 50. The input portion 42 also receive signals generated by encoders of the servomotors, through a suitable controller.

Figure 6:
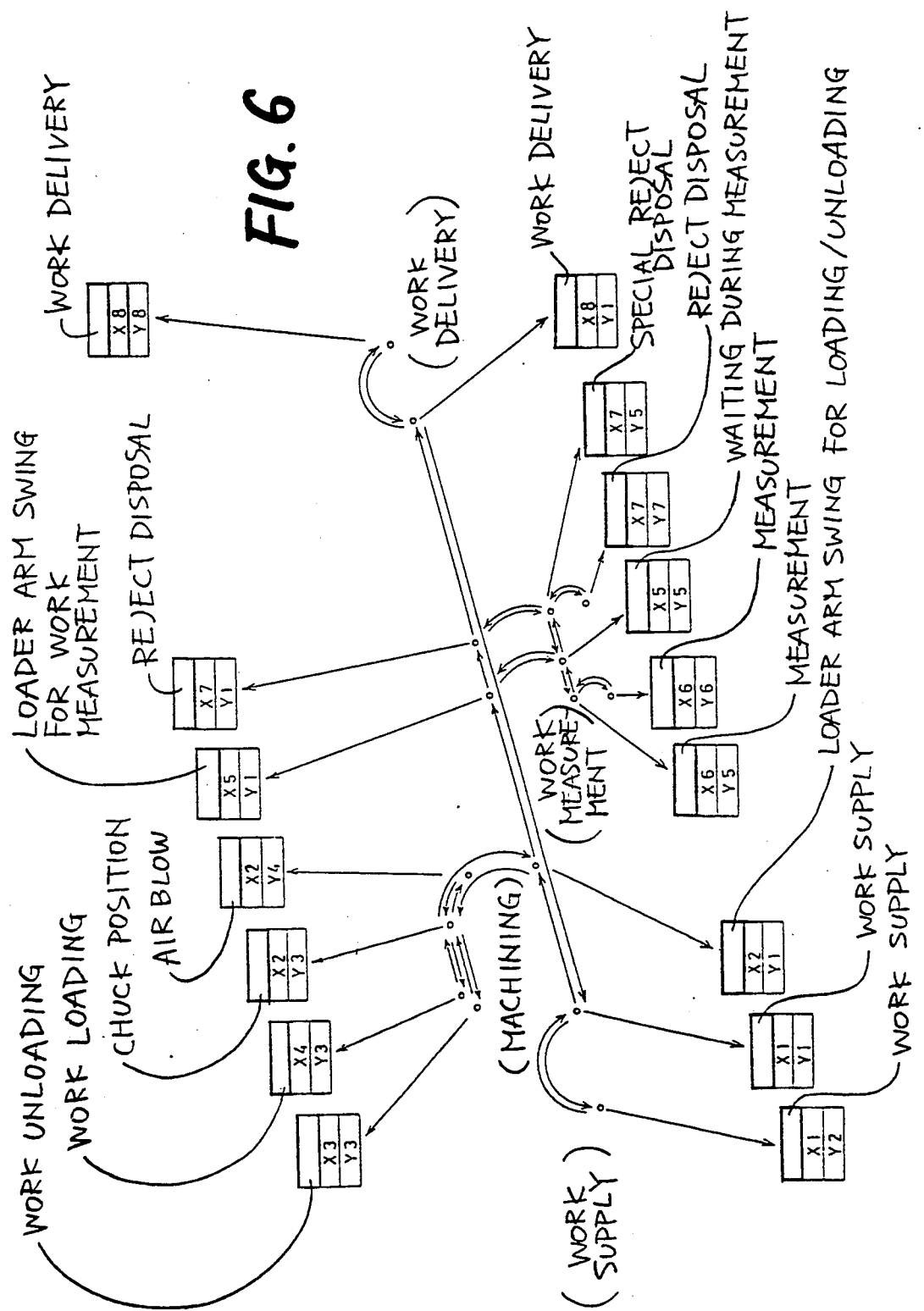
FIG. 6 is an illustrating indicating paths taken by a workpiece.

The paths taken by the unmachined and machined workpieces on the machining line 50 are indicated in FIG. 6. The position of the workpiece is determined by the position of the carriage 104 in the longitudinal direction of the guide rails 100, 102, the angular position of the loader table 106, and the pivot or swing position of the loader arm 108. In FIG. 6, "X" represents the position of the carriage 104, while "Y" represents the swing position of the loader arm 108.

It will be seen from the illustration of FIG. 6 that the workpiece supplied by the work supply device 80 is brought to the chuck 92 of the lathe 82, and then machined by the lathe 82. The machined workpiece is removed from the lathe 82, and measured by the work measuring device. If the measurement indicates that the machined workpiece has a dimensional error exceeding the permissible limit, the workpiece is treated as a reject and is transferred to a reject storage. If the dimensions of the machined workpiece are within the tolerances, the workpiece is transferred onto the work delivery conveyer 86.

For example, the SEQUENCE memory 24 stores a batch of operation commands, an initial portion of which is listed in Table 1, for transferring the unmachined and machined workpieces, loading the unmachined workpiece onto the lathe 82 and unloading the machined workpiece from the lathe 82.

pressed in the hexadecimal notation. The first and second digits (two digits from the least significant digit or the rightmost digit) constitute an operation code which represents an event of operation of the machining line 50. The third digit represents an auxiliary command. An example of the functions assigned to the numerals of this third digit is indicated in Table 2.

TABLE 2

| | |
|---|---|
| 0: | NORMAL OPERATION MODE |
| 1: | SKIP DESIGNATION |
| 2: | TWO OR MORE OPERATIONS PERFORMED IN PARALLEL |
| 4: | (Not assigned) |
| 8: | (Not assigned) |

The most significant digit or fourth digit of the operation commands represents the number designating one of 16 interlock condition tables for the relevant sequence number or for the relevant event of operation represented by the corresponding operation code. Each interlock condition table for each event of operation defines start conditions that should be satisfied to start the relevant operation, and continuing conditions that should be satisfied for the relevant operation to continue. These start and continuing conditions are represented by 128 bits (16×8) each of which corresponds to one operating condition of the machining line 50. Thus, a total of 128 operating conditions (each being either a start condition or a continuing condition) of various components, devices or other aspects of the machining line 50. A logical value "1" is set to each bit of the

TABLE 1

| 1 | 0090 | START (WORK SUPPLY) | |
|---|---|---|---|
| 2 | 0215 | LOADER TABLE ROTATED TO POSITION 1 | |
| 3 | 0219 | LOADER HEAD ROTATED TO POSITION 4 | |
| 4 | 0221 | CARRIAGE MOVED TO SUPPLY POSITION | X1 |
| 5 | 0015 | LOADER TABLE ROTATED TO POSITION 1 | |
| 6 | 0019 | LOADER HEAD ROTATED TO POSITION 4 | |
| 7 | 0021 | CARRIAGE MOVED TO SUPPLY POSITION | X1 |
| 8 | 0070 | WAITING FOR WORK SUPPLY | |
| 9 | 0032 | LOADER ARM SWUNG TO RECEIVE WORKPIECE | Y2 |
| 10 | 0010 | LOADING CHUCK CLOSED | |
| 11 | 0031 | LOADER ARM SWUNG TO ORIGINAL POSITION | Y1 |
| 12 | 0080 | CONDITIONAL SKIP 1 | |
| 13 | 0050 | TIME MEASUREMENT | |
| 14 | 0050 | TIME MEASUREMENT | |
| 15 | 0091 | START (WORKPIECE UNLOADING) | |
| 16 | 0214 | LOADER TABLE ROTATED TO POSITION 2 | |
| 17 | 0218 | LOADER HEAD ROTATED TO POSITION 3 | |
| 18 | 0222 | CARRIAGE MOVED TO ARM SWING POSITION | X2 |
| 19 | 0014 | LOADER TABLE ROTATED TO POSITION 2 | |
| 20 | 0018 | LOADER HEAD ROTATED TO POSITION 3 | |
| 21 | 0022 | CARRIAGE MOVED TO ARM SWING POSITION | X2 |
| 22 | 0071 | WAITING FOR COMPLETION OF MACHINING | |
| 23 | 0080 | CONDITIONAL SKIP 1 | |
| 24 | 0033 | LOADER ARM SWUNG TO CHUCK POSITION | Y3 |
| 25 | 0023 | CARRIAGE MOVED TO UNLOADING POSITION | X3 |
| 26 | 0041 | LATHE CHUCK OPENED | |
| 27 | 0012 | UNLOADING CHUCK CLOSED | |
| 28 | 1022 | CARRIAGE MOVED TO ARM SWING POSITION | X2 |
| 29 | 0034 | LOADER ARM SWUNG TO AIR BLOW POSITION | Y4 |
| 30 | 0051 | AIR BLOW 1 | |
| 31 | 1016 | LOADER HEAD ROTATED TO POSITION 1 | |
| 32 | 0081 | CONDITIONAL SKIP 2 | |
| 33 | 1031 | LOADER ARM ROTATED TO ORIGINAL POSITION | Y1 |
| 34 | 0181 | CONDITIONAL SKIP 2 | |

The numbers in the leftmost or first column in Table 1 are sequence numbers which are counted by the SEQUENCE counter 22 and which represent the order in which events of operation of the machining line 50 are sequentially performed. The four digits in the second column represent operation commands for each sequence of operation. Each of these four digits is expressed in the hexadecimal notation. The first and second interlock condition table which corresponds to each operating condition that should be satisfied to start or continue the relevant event of operation. An example of the interlock condition table is partially indicated in Table 3, which consists of eight columns Nos. 0 through 7, each column consisting of 16 operating conditions.

The zeroth column of operating conditions are the start conditions, while the operating condition in the first through seventh columns are the continuing conditions. Table 3 indicates only the zeroth and first columns.

TABLE 3

| | Column 0 | Column 1 |
|---|---|---|
| 0 | NO WORK ON SUPPLY DEVICE | LOADER MAY CHUCK NEW WORK |
| 1 | NO WORK ON CONVEYER | LOADER TABLE MAY BE ROTATED TO POSITION 1 |
| 2 | NO WORK IN LOADING CHUCK | LOADER MAY DELIVER WORK |
| 3 | NO WORK AT MEASURING DEVICE | LOADER TABLE MAY BE ROTATED TO POSITION 1 |
| 4 | LOADING CHUCK MAY BE CLOSED | WORK MAY BE UNLOADED |
| 5 | UNLOADING CHUCK MAY BE OPENED | WORK MAY BE LOADED |
| 6 | LOADING CHUCK FULLY OPEN | LOADER ARM AT AIR BLOW POSITION |
| 7 | UNLOADING CHUCK FULLY OPEN | LOADER ARM AT CHUCK POSITION |
| 8 | LATHE CHUCK FULLY OPEN | LOADER ARM AT MEASURING POSITION 1 |
| 9 | | LOADER ART AT MEASURING POSITION 2 |
| A | | |
| B | | |
| C | | |
| D | | |
| E | | |
| F | | |

In the interlock condition table exemplified above, the 128 interlock conditions are set with a logical value "1" or "0", such that the "1" signifies that the corresponding interlock condition should be satisfied, while the value "0" signifies the interlock condition that is not required to be satisfied. Since the hexadecimal notation is used for the fourth digit of the operation commands, up to 16 interlock condition tables are available for each two-digit operation code or for each event of operation represented by the appropriate operation code. Namely, the same kind of operation may use different interlock condition tables. For example, the operation code "22" used for the sequence numbers 21 and 28 in Table 1 represents movements of the carriage 104 to the loader arm swing position X2 at which the loader arm 108 is permitted to be swung in the plane perpendicular to the axis of the spindle 90, for unloading a machined workpiece from the chuck 92 and loading a new workpiece on the chuck 92. However, the movement of the carriage 104 effected in the operation of the sequence number 21 takes place with the loading chuck 112 holding the new workpiece, while the movement of the carriage 104 effected in the operation of the sequence number 28 takes place with the unloading chuck 112 holding the machined workpiece and the loading chuck 112 holding the machined workpiece removed from the chuck 92. Accordingly, the different sets of interlock conditions should generally be used for the sequence numbers 21 and 28, even if the events of operation are represented by the same operation code "22". Since the operation commands includes the fourth digit for designating the interlock condition table, the same operation code may use different interlock condition tables, depending upon the situations in which the operation represented by that operation code is performed.

The rightmost column in Table 1 indicates the X position of the carriage 104 and the Y position of the loader arm 108, and the second column to the right of the rightmost column indicates the events of operation represented by the two-digit appropriate operation code of the four-digit operation commands. In Table 1, "LOADER TABLE ROTATED TO POSITION 1" means that the loader table 106 is rotated to the position in which the loader arm 108 can be swung in the plane of FIG. 5 which is parallel to the axis of the main spindle 90. Further, "LOADER TABLE ROTATED TO POSITION 2" means that the loader table 106 is rotated to the position in which the loader arm 108 can be swung in the plane perpendicular to the axis of the spindle 90. "LOADER HEAD ROTATED TO POSITION 4" at the sequence number 3, for example, means that the loader head 110 is rotated to position 4. More specifically, the loader head 110 which has the two chucks 112 (loading and unloading chucks) has four positions 1, 2, 3 and 4. With the loader head 110 placed in one of the positions 1 and 3, the centerline of the two chucks 112 lies in a horizontal plane, with the two chucks 112 facing in the opposite horizontal directions. In the head positions 2 and 4, the centerline of the chucks 112 lies in a vertical plane, with the chucks facing upwards and downwards, respectively. As indicated in FIG. 6, the carriage 104 has eight X positions X1-X8 in the axial direction of the spindle 90, while the loader arm 108 has eight Y positions Y1-Y8 at which the loader head 110 is located. "ARM SWING POSITION X2" (at the sequence number 21, for example) is a position of the carriage 104 at which the loader arm 108 is swung toward and away from the extension of the axis of the spindle 90, for loading and unloading unmachined and machined workpieces. "CHUCK POSITION" (at the sequence number 24) is a position of the loader head 110 which is aligned with the axis of the chuck 92 (spindle 90).

Figures 1, 2A:
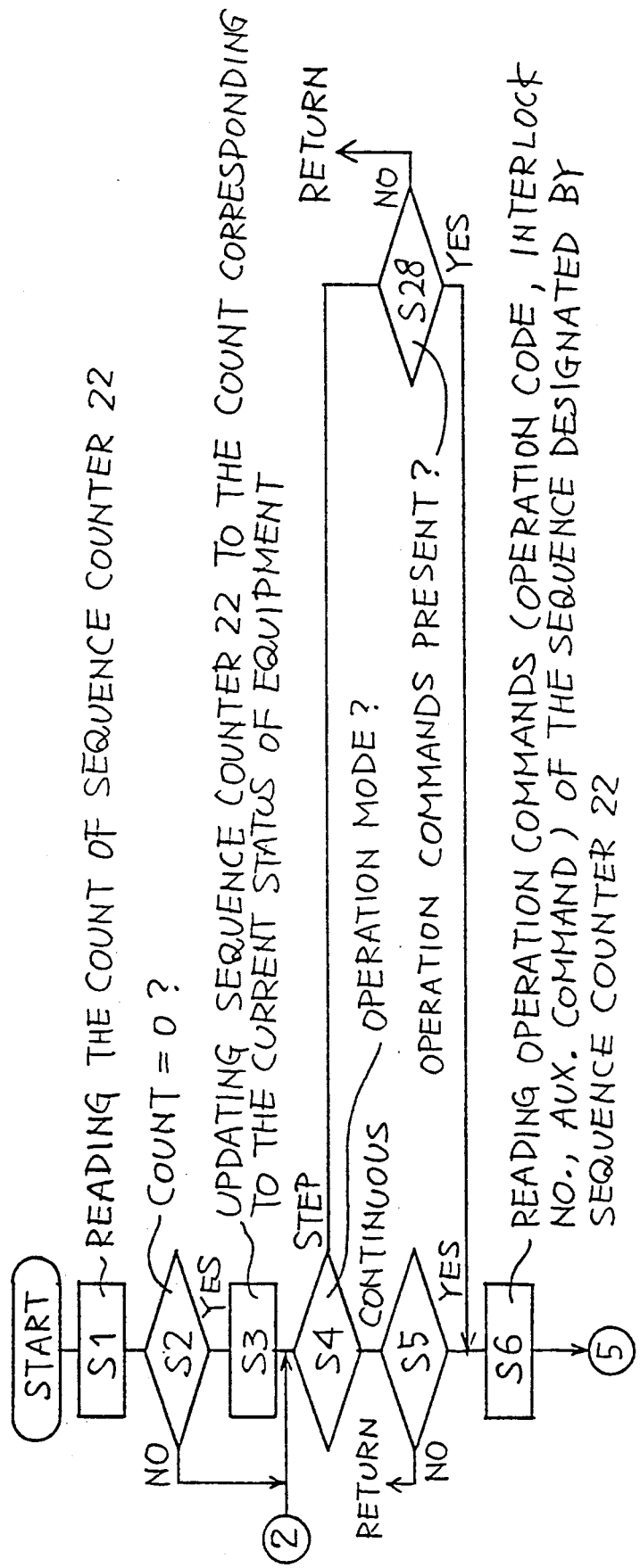
FIGS. 2A(1-2) and 2B(1-2) are flow charts illustrating a control program stored in a read-only memory of the sequence control apparatus of, FIG. 1.
Figures 2, 2A:
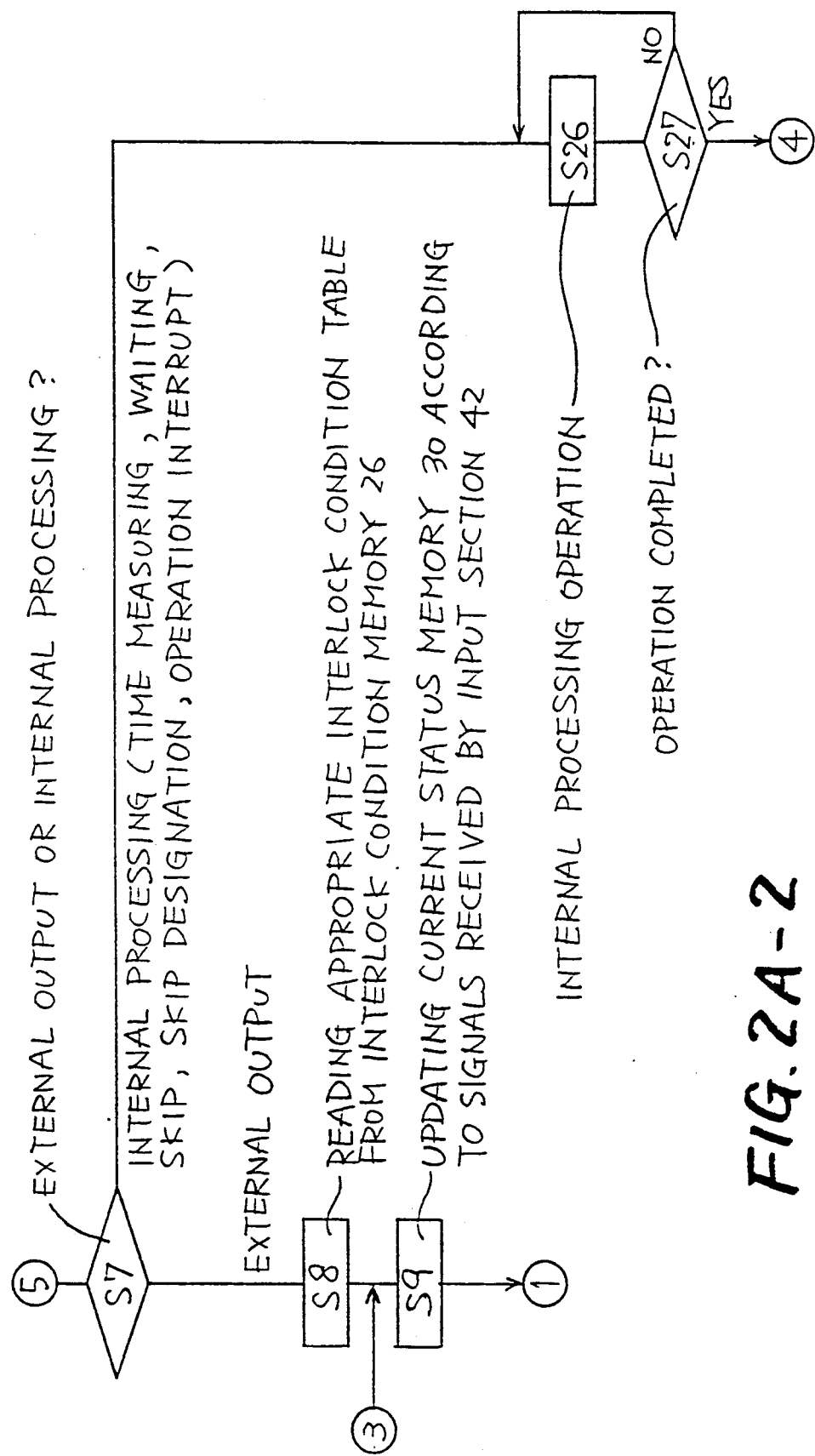
Figures 1, 2B:
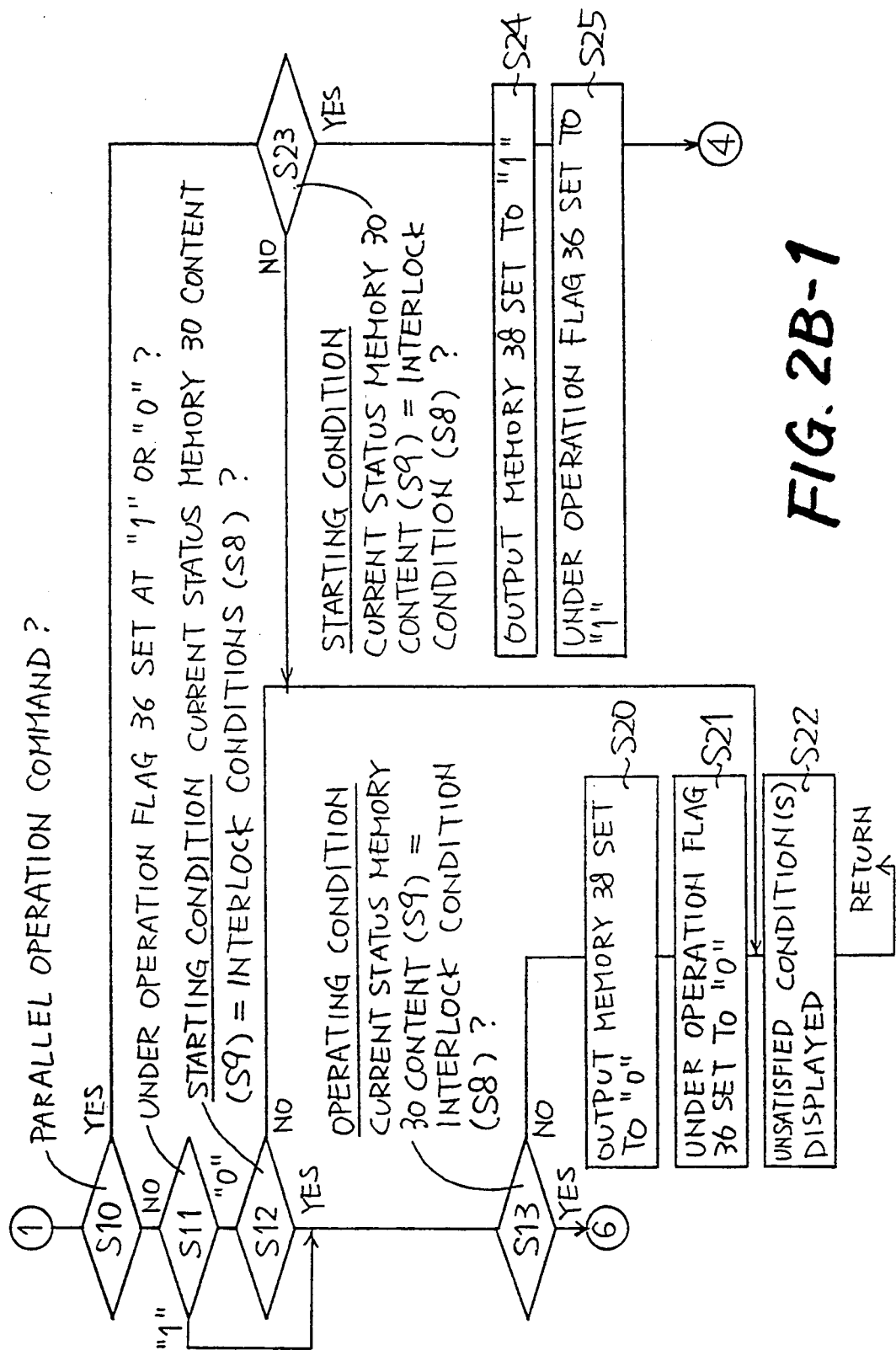
Figures 2, 2B:
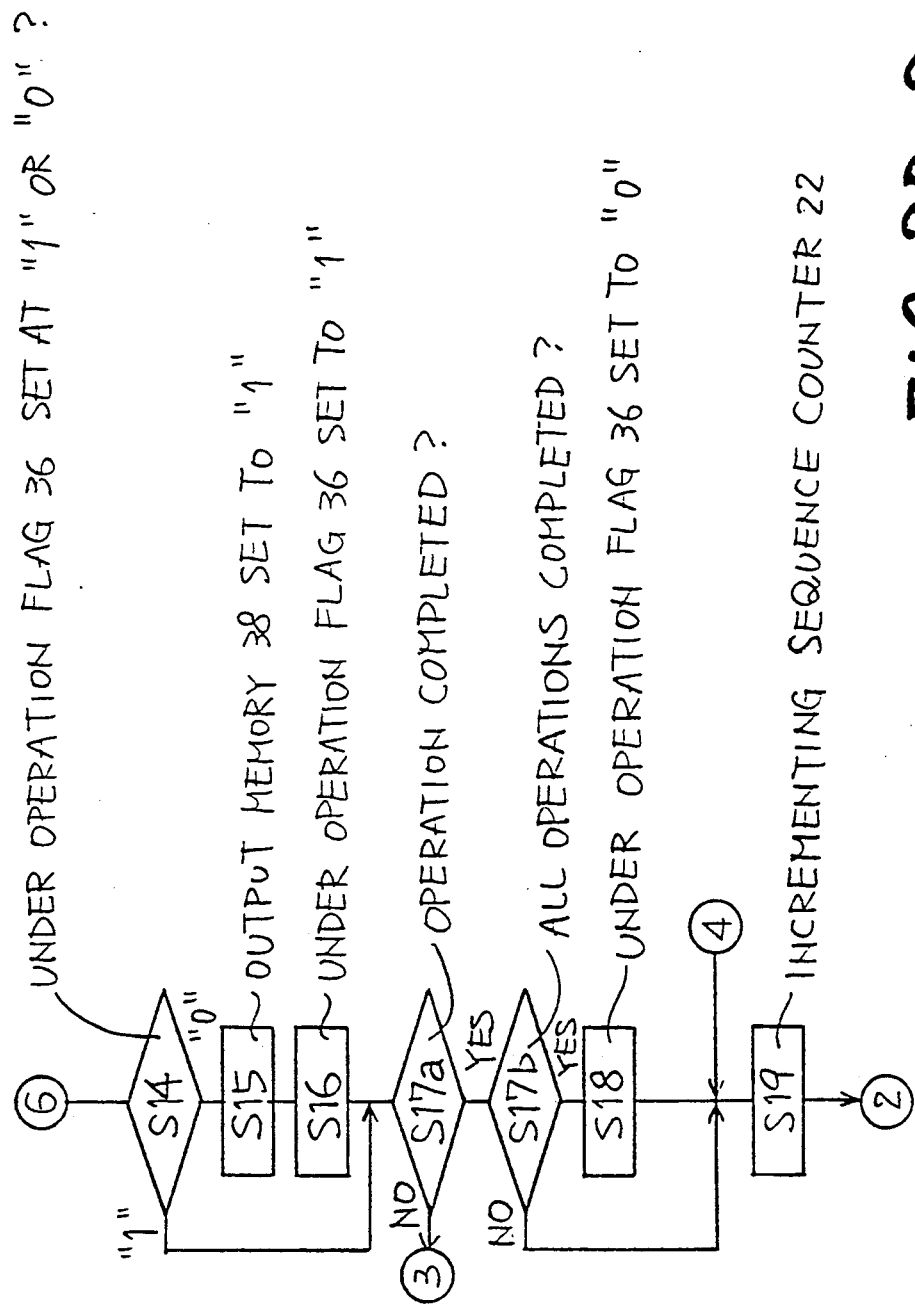

Referring to the flow charts of FIGS. 2A and 2B, there will be described an operation of the present sequence control apparatus.

The sequence control apparatus is operated under the control of a main computer which controls the automatic machining line 50 as a while. In response to a command from the main computer, the control program illustrated by the flow charts of FIGS. 2A, 2B is executed in the following manner.

Initially, step S1 is executed to read the count of the SEQUENCE counter 22. Then, the control flow goes to step S2 to determine whether the count of the counter 22 is zero ("0") or not. The present sequence control apparatus is adapted such that the machining line 50 can be reset and started even where the operating conditions (represented by the contents of the CURRENT STATUS memory 30) of the machining line 50 do not meet the interlock conditions of the interlock condition table corresponding to a current count of the SEQUENCE counter 22 (corresponding to a given event of operation). In the event the relevant interlock conditions are not met due to any operation of the machining line 50, the SEQUENCE counter 22 is automatically reset to "0". If the content of the counter 22 is "0", step S3 is executed to scan the INTERLOCK CONDITION memory 26 to determine one of the interlock condition tables which coincides with the operating conditions of the machining line 50 which are represented by the current status of the CURRENT STATUS memory 30. Namely, step S3 is executed to update the count of the SEQUENCE counter 22 so that the undated count represents the sequence number whose interlock condition table (stored in the INTERLOCK CONDITION memory 26) represents the interlock conditions corresponding to the current status of the machining line 50 (conditions of the lathe 82, work loader 84, work measuring device, etc.) represented by the current content of the CURRENT STATUS memory 30. That is, the SEQUENCE counter 22 of the sequence control apparatus is set into agreement with the current status of the machining line 50, so that the machining line 50 can be re-started from the current status of the machining line 50.

Normally, a negative decision "NO" is obtained in step S2, and the control flow goes to step S4 to determine whether the MODE flag 32 is set to establish the CONTINUOUS mode or the STEP mode. These modes are selectively established by operating a mode selector provided on the main control unit of the machining line 50. In this specific example, it is assumed that the CONTINUOUS mode is currently established. Accordingly, step S4 is followed by step S5 to determine, based on the content of the CONTINUOUS OPERATION flag 34, whether the machining line is operating in the CONTINUOUS mode. If the operation in the CONTINUOUS mode has not been started yet with the CONTINUOUS mode already selected, a negative decision "NO" is obtained in step S5, whereby the control flow returns to the initial position of the control program. Thus, one cycle of execution of the control program is completed.

If the machining line 50 is operating in the CONTINUOUS mode, an affirmative decision "YES" is obtained in step S5, and step S6 is executed to read the operation commands (interlock condition number, auxiliary command, and operation code) of the sequence number represented by the current count of the SEQUENCE counter 22. Step S6 is followed by step S7 to determine if the operation code read in step S6 requires the sequence control apparatus to provide an output to any actuators of the machining line 50, or requires the apparatus to perform an internal processing operation.

If the relevant operation code requires an external output to the machining line 50, the control flow goes to step S8 in which the CPU 12 reads the interlock condition table of the current sequence number from the INTERLOCK CONDITION table 26. Step S8 is followed by step S9 in which the content of the CURRENT STATUS memory 30 is updated according to the output signals of the detectors and other components of the machining line 50, which are currently received by the input section 42 of the sequence control apparatus. Then, the control flow goes to step S10 to determine whether or not the value of the auxiliary command of the relevant operation commands is "2", that is, whether the auxiliary command is a parallel operation command for performing in parallel a plurality of operations represented by the operation code of the present sequence number and an operation code or codes represented by the following sequence number or numbers. If the auxiliary command is not a parallel operation command, a negative decision "NO" is obtained in step S10, and the control flow goes to step S11 to determine whether the UNDER OPERATION flag 36 is set at "1" or not. If the servomotor, hydraulic cylinder or other actuator of the machining line 50 which corresponds to the current sequence number (current count of the counter 22) is not in operation, the UNDER OPERATION flag 36 is set at "0", whereby step S12 is executed to determine whether or not the start conditions of the interlock condition table read in step S8 coincide with the corresponding conditions represented by the content of the CURRENT STATUS memory 30 updated in step S9. Usually, the start conditions of the interlock condition table are satisfied, and an affirmative decision "YES" is obtained in step S12. In this case, step S13 is implemented to determine whether or not the continuing conditions of the interlock condition table coincide with the corresponding conditions represented by the content of the CURRENT STATUS memory 30. An affirmative decision "YES" is normally obtained in step S13, and step S14 to determine whether the UNDER OPERATION flag 36 is set at "1" or "0". If the relevant actuator of the machining line 50 is not in operation, the flag 36 is set at "0", and the control flow goes to step S15 to set the OUTPUT memory 38 to "1". As a result, a command is generated from the output section 44, for activating the relevant actuator to cause the machining line 50 to perform an operation corresponding to the current sequence number represented by the count of the SEQUENCE counter 22.

Step S15 is followed by step S16 in which the UNDER OPERATION flag 36 is set to "1". The control flow then goes to step S17a to determine whether the relevant operation of the machining line 50 is completed, or not. Initially, a negative decision "NO" is obtained in this step S17a, and the control flow returns to step S9, whereby the content of the CURRENT STATUS memory 30 is updated into conformity with the current operating conditions of the machining line 50. Steps S10 and S11 are then implemented. Since the UNDER OPERATION flag 36 was set in the last execution of step S16, the control flow skips step S12 and goes to step S13. Since the determination as to the start conditions in step S12 is unnecessary after the relevant operation has been started, only the determination as to the continuing conditions is effected in step S13.

Then, the control flow goes to step S14 to determine whether the UNDER OPERATION flag 36 is set at "1" or not. Since the flag 36 was set to "1", steps S15 and S16 are skipped, and step S17a is implemented. Thus, steps S9, S10, S11, S13, S14 and S17a are repeatedly executed until the relevant operation started in step S15 is completed, i.e., until an affirmative decision "YES" is obtained in step S17a. Upon completion of the relevant operation, step S17b is implemented to determine whether all of the simultaneously started operations by the respective actuators are completed or not.

In the case where a simultaneous start command is not present and a negative decision "NO" is obtained in step S10, only one actuator corresponding to the present sequence number is activated to perform the relevant operation, and an affirmative decision "YES" is obtained in step S17b when an affirmative decision "YES" is obtained in step S17a. In this case, step S18 is executed to reset the UNDER OPERATION flag 36 to "0", and step S19 is implemented to increment the count of the SEQUENCE counter 22. Subsequently, the control flow goes back to step S4, to implement the subsequent steps for the next sequence number represented by the updated counter 22.

If, during an operation of the machining line 50, there arises any abnormality that causes discrepancy or disagreement between the content of the CURRENT STATUS memory 30 and the interlock condition table corresponding to the current count of the SEQUENCE counter 22, a negative decision "NO" is obtained in step S12 or S13. If the continuing conditions are not satisfied, a negative decision "NO" is obtained in step S13, and step S20 is implemented to reset the OUTPUT memory 38 to "0", to interrupt the relevant operation of the machining line 50. Step S20 is followed by step S21 to reset the UNDER OPERATION flag 36 to "0". Step S21 is followed by step S22 in which the content of the disagreement is indicated by characters provided on the liquid crystal display 58 of the programming console 46 as shown in FIG. 3, to inform the operator of the presence of the abnormality. In this case, the execution of the control program is terminated in this step S22. If the disagreement occurs in terms of the start conditions, a negative decision "NO" is obtained in step S12, and step S22 is implemented to inform the operator of the abnormality that has causes the disagreement. In the event of any abnormality that prevents the relevant operation from continuing, the machining line 50 is automatically stopped, and the interlock conditions that are not satisfied are displayed on the display 58 to inform the operator of the cause or causes for the abnormality. Thus, the operator may easily locate the abnormal condition or conditions and deal with the abnormality. The indication of the abnormality remains on the display 58 until a reset switch on the main control unit of the machining line 50 is operated.

If an affirmative decision "YES" is obtained in step S10, namely, if the value of the auxiliary command read in step S6 is "2" indicative of a parallel operation command as in the sequence number 2 in the example of Table 1, the control flow goes to step S23 to determine whether the start conditions of the interlock condition table read in step S8 coincide with the corresponding conditions represented by the content of the CURRENT STATUS memory 30 updated in step S9. If there exists disagreement between the interlock condition table and the content of the CURRENT STATUS memory 30, step S22 is executed to display the start condition or conditions which is/are not currently met. Normally, the start conditions of the interlock condition table are all met, and step S24 is implemented to set the OUTPUT memory 38 to "1" to activate the hydraulic motor to rotate the loader table 106 to the position 1 according to the operation code "15" of the sequence number 2. In the next step S25, the UNDER OPERATION flag 36 is set to "1". Then, the control flow goes to step S19 to increment the count of the SEQUENCE counter 22. As indicated in Table 1, the value of the auxiliary command of the sequence number 3 is also a simultaneous start command, and the induction motor is activated to rotate the loader head 110 to the position 4 according to the operation code "19". The SEQUENCE counter 22 is then incremented to go to the next sequence number 4. Since the auxiliary command of the sequence number 4 is also a parallel operation command, step S24 is again executed to activate the servomotor to move the carriage 104 to the work supply position X1 according to the operation code "21". Since the control program of FIGS. 2A, 2B is executed in an extremely short time, the start commands to activate the hydraulic motor, induction motor and servomotor for the loader table 106, loader head 110 and carriage 104 are generated at substantially the same time in respective executions of step S24, after the comparison of only the start conditions of the CURRENT STATUS memory 30 with those of the interlock condition table. That is, the comparison of the continuing conditions is not made before the start commands are generated, for the reason which will become apparent from the following explanation.

The operation commands of the following sequence numbers 5, 6 and 7 include the operation codes "15", "19"and "21", which are identical with those of the sequence numbers 2, 3 and 4, respectively. However, the auxiliary commands of the sequence numbers 5, 6, 7 are not a parallel operation command, whereby step S13 is executed to determine whether the continuing conditions of the interlock condition table are satisfied by the corresponding conditions represented by the content of the CURRENT STATUS memory 30. In this case, step S12 is skipped since the UNDER OPERATION flag 36 was set to "1" in step S16 for the sequence number 2. If any one of the continuing conditions of any one of the three operations of the sequence numbers 5, 6, 7 is not satisfied, the corresponding operation is interrupted in step S20, namely, the machining line 50 is brought to a stop. Thus, the three operations of the sequence numbers 2-4 (sequence numbers 5-7) are almost simultaneously started, and then the continuing conditions of the three operations are sequentially checked. Therefore, the SEQUENCE memory 24 should store the operation commands for the above three operations such that the operation commands for the actuator whose operation is completed first are stored in the memory area corresponding to the sequence number 5, and such that the operation commands for the actuator whose operation is completed last are stored in the memory area corresponding to the sequence number 7. In other words, the substantially simultaneously started events of operation should take place in the order of the operating time, i.e., in the order in which the events of operation are completed.

The series of operations in the example of Table 1 will be further described. While the count of the SEQUENCE counter 22 remains "5", steps S9 through Step S17a are repeatedly executed, to allow a time for the loader table 106 to be rotated to the position 1 by the hydraulic motor (actuator). Upon completion of the rotating operation of the loader table 106, an affirmative decision "YES" is obtained in step S17a, and step S17b is implemented. At this time, a negative decision "NO" is obtained in step S17b since the operations of the loader head 110 and carriage 104 have not been completed. Consequently, step S18 is skipped and step S19 is implemented to increment the SEQUENCE counter 22. In the next execution of step S13, therefore, the continuing conditions for the loader head 110 are checked.

Upon completion of the operation of the loader head 110, step S17a is followed by step S17b. Since the operation of the carriage 104 is not completed at this time, a negative decision "NO" is obtained in step s17b, whereby the count of the SEQUENCE counter 22 is incremented, without execution of step S18 to reset the UNDER OPERATION flag 36. Consequently, the continuing conditions for the carriage 104 are checked in the next execution of step S13. Upon completion of the movement of the carriage 104 to the work supply position X1, an affirmative decision "YES" is obtained in both steps S17a, S17b, whereby the UNDER OPERATION flag 36 is reset to "0" and the counter 22 is incremented. Thus, the substantially simultaneously started three operations are completed sequentially.

Referring back to step S6, step S27 is executed if the operation commands of the relevant sequence number should be processed within the sequence control apparatus. Examples of operations represented by the internally processed operation commands include "TIME MEASURING", "WAITING", "SKIP", "SKIP DESIGNATION" and "OPERATION INTERRUPT", which will be described.

The "TIME MEASURING" operation code is "50" as appearing at the sequence numbers 13 and 14 in Table 1. The third and fourth digits in combination with the first and second digits which constitute the TIME MEASURING operation code "50" are used to represent a time to be measured. As described before, the third and fourth digits are usually used to represent the auxiliary command and the interlock condition table number, respectively. In the example of Table 1, the third and fourth digits of the sequence numbers 13 and 14 are "0". This means that the time to be measured is zero, and therefore no time measuring operations are actually effected. In this example, the time measuring operations at the sequence numbers 13 and 14 are provided by dummy operations, which may be subsequently used for any operations that should be added or inserted following the sequence number 11, if such additional operations are required due to a change in the sequence of operations to be performed by the machining line 50.

In the example of Table 1, the operation code "70" is used as the "WAITING" operation code. This code "70" prevents the operation of the next sequence number from starting until the specific condition has been satisfied. In this example, the loader arm 108 is not swung to the work receiving position Y2 until the workpiece is supplied to the work receiving position.

The "SKIP" operations may be either conditional or unconditional. The operation code "81" (CONDITIONAL SKIP 2) at the sequence number 32 in Table 1 is an example of the "CONDITIONAL SKIP" code. This code 81 causes the control to skip to a designated sequence number, when a specific condition is satisfied. Namely, the content of the SEQUENCE counter 22 is changed to the designated sequence number. The sequence number to which the control skips according to the conditional skip code "81" is that of the operation commands whose operation code is "81" and whose value of the auxiliary command is "1". In the example, the sequence number 34 is the designated sequence number. The "CONDITIONAL SKIP DESIGNATION" commands are illustrated at the sequence number 34, as described above. The SKIP DESIGNATION commands do not activate any actuators of the machining line 50. It is noted that the skip condition tables stored in the INTERLOCK CONDITION memory 26 are used as the skip conditions that should be satisfied for the conditional skip operations to be performed. The fourth digit of the operation commands including a conditional skip code is used to designate the interlock condition table as the conditional skip condition table for the relevant conditional skip. That is, the interlock condition table is used as a skip condition table representative of the skip condition that should be satisfied when the relevant conditional skip operation is performed.

The "UNCONDITIONAL SKIP" and "UNCONDITIONAL SKIP DESIGNATION" commands are not illustrated in the example of Table 1. If the UNCONDITIONAL SKIP commands are read in step S6, the control unconditionally skips to the sequence number designated by the UNCONDITIONAL SKIP DESIGNATION commands.

The "OPERATION INTERRUPT" code, which is not illustrated in the example of Table 1, either, inhibit the sequence control apparatus from applying any operating commands to the machining line 50 until a start switch on the main control unit is operated. That is, the CONTINUOUS mode of operation of the machining line is interrupted. The OPERATION INTERRUPT code cannot be inserted between the sequence numbers involving the parallel operation command described above, but can be inserted at any other positions of the control program. Accordingly, the OPERATION INTERRUPT code permits the machining line 50 to be temporarily stopped at a desired point of time.

While the CONTINUOUS mode of operation of the machining line 50 has been described, the operations in the STEP and MANUAL modes will be described.

The CONTINUOUS mode may be changed to the STEP or MANUAL mode by operating the mode selector switch on the main control unit of the machining unit, or by operating the STEP MODE or MANUAL MODE switch 62, 64 on the operator's control unit 48 of FIG. 4, together with the ENABLE switch 60. With the ENABLE switch 60 operated, the corresponding indicator light 74 is turned on, indicating that the operator's control unit 48 is operative. When the STEP MODE switch 62 is operated in this condition, the machining line 50 is placed in the STEP mode, and step S4 is followed by step S28 to determine whether operation commands are present as a result of an operation of the FORWARD INCREMENT switch 68 or REVERSE DECREMENT switch 70 on the operator's control unit 48.

When the FORWARD INCREMENT switch 68 is operated, one of the actuators corresponding to one of the actuator selector switches 72 whose indicator light 74 is illuminated is activated. That is, the indicator light 74 of the actuator selector switch 72 corresponding to the current count of the SEQUENCE counter 22 read in step S1 is illuminated, and the corresponding actuator of the machining line 50 is activated upon operation of the FORWARD INCREMENT switch 68.

When the REVERSE DECREMENT switch 70 is operated for the first time, the indicator light 74 corresponding to the actuator assigned to perform the operation of the sequence number which precedes the sequence number designated by the current content of the SEQUENCE counter 22 is illuminated. When the switch 70 is operated the second time, the actuator corresponding to the illuminated indicator light 74 is activated, and the indicator light 74 corresponding to the preceding sequence number is illuminated.

In the STEP mode using the FORWARD INCREMENT switch 68 or REVERSE DECREMENT switch 70 as described above, the actuator of the machining line 50 which is operated next is indicated by the corresponding indicator light 74, whereby the operator is informed of the content of the operation to be performed next, assuring safety of operation.

If the operation commands generated upon operation of the FORWARD INCREMENT or REVERSE DECREMENT switch 68, 70 do not require an operation of any actuator of the machining line 50, none of the indicator lights 74 are illuminated. In this case, the operator depresses the switch 68 or 70 repeatedly until one of the lights 74 is illuminated. If the actuator whose indicator light 74 is on has been operated upon operation of the switch 68, 70, the operation of the switch 68, 70 merely maintains the relevant actuator in the operated position.

While the machining line 50 is placed in the MANUAL mode with the MANUAL MODE switch 64 in the operated position, the actuators of the machining line 50 are selectively activated by operating the corresponding actuator selector switches 72. More specifically, the desired actuator is first selected by the corresponding actuator selector switch 72, and the FORWARD INCREMENT or REVERSE DECREMENT switch 68, 70 is operated to operate the selected actuator in the forward or reverse direction. Thus, the MANUAL mode of operation requires operations of the two switches, that is, the actuator selector switch 72 for selecting the actuator to be operated, and the switch 68, 70 for selecting the direction in which the actuator is operated. This arrangement assures safety of operation in the MANUAL mode. Further, the present arrangement does not require two switches conventionally used for each actuator the forward and reverse operations thereof, and therefore permits reduction in the number of the switches required in the MANUAL mode. Namely, the number of the required switches is reduced to almost a half of the conventionally required number. Accordingly, the operator's control unit 48 is made comparatively small-sized. Since only the two switches (switches 68, 70) are selectively operated for selecting the operating direction for each actuator, the possibility of an erroneous operation is lowered.

In the event the interlock conditions of a given operation that are not satisfied are displayed on the display 58 in step S22, the corresponding indicator light 74 on the operator's control unit 48 flickers to indicate the operator that the actuator selector switch 72 whose light 74 is flickering is not operative to activate the corresponding actuator of the machining line 50. In the present embodiment, therefore, not only the liquid crystal display 58 but also the indicator lights 74 serve to indicate the operation or actuator whose interlock conditions are not satisfied.

It will be understood from the above description of the present embodiment that the SEQUENCE memory 24 serves as memory means for storing sets of operation commands for sequentially commanding respective events of operation of the machining line 50, while the INTERLOCK CONDITION memory 26 serves as interlock condition memory means for storing interlock conditions for each event of operation. It is also noted that the portions of the computer 10 assigned to execute steps S1, S6 and S9-S21 of FIGS. 2A, 2B serve as control means, and that the operator's control unit 48 having the FORWARD INCREMENT and REVERSE DECREMENT switches 68, 70 serves as a device for operating the machining line 50 in the STEP mode. Further, the indicator lights 74 serve as means for indicating an operation to be performed next.

In the above embodiment, different operation codes are used for skip operations whose conditions are different. That is, the CONDITIONAL SKIP 1 is designated by the operation code "80" while the CONDITIONAL SKIP 2 is designated by the operation code "81". However, it is possible to provide the backup RAM 120 with a SKIP CONDITION memory 122 which stores a plurality of skip condition tables similar to the interlock condition tables stored in the INTERLOCK CONDITION memory 26. The skip condition tables represent different sets of skip conditions that should be satisfied to effect the skip operation. In this case, only one operation code is used to designate the skip operation, and the most significant digit of the operation commands is used to designate one of the skip condition tables, rather than the interlock condition tables. An example of a modified control program adapted to the embodiment having the SKIP CONDITION memory 122 is partially illustrated in FIGS. 8A and 8B.

Figure 8A:
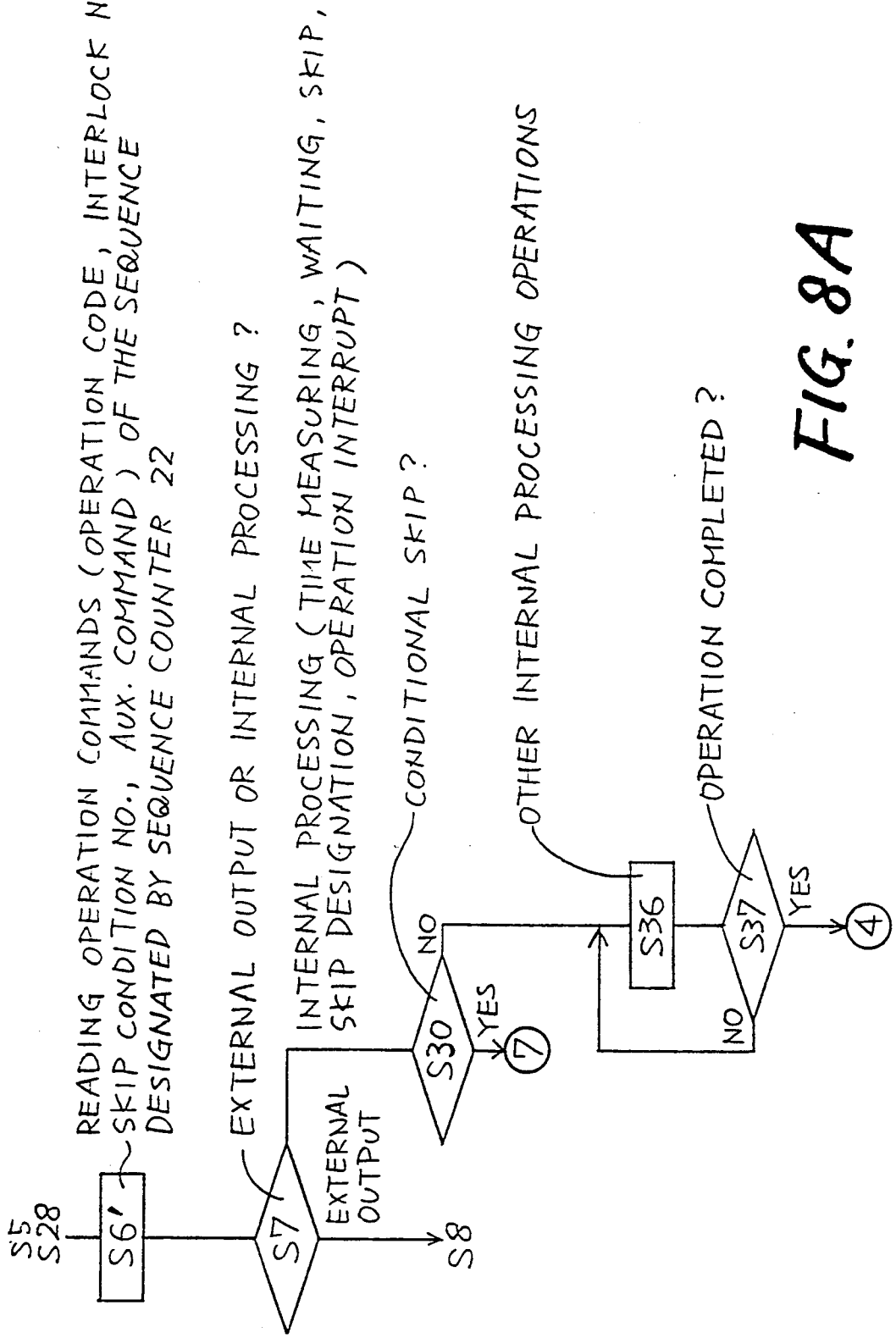
FIGS. 8A and 8B are flow charts showing a portion of a control program used in the embodiment of FIG. 7.
Figure 8B:
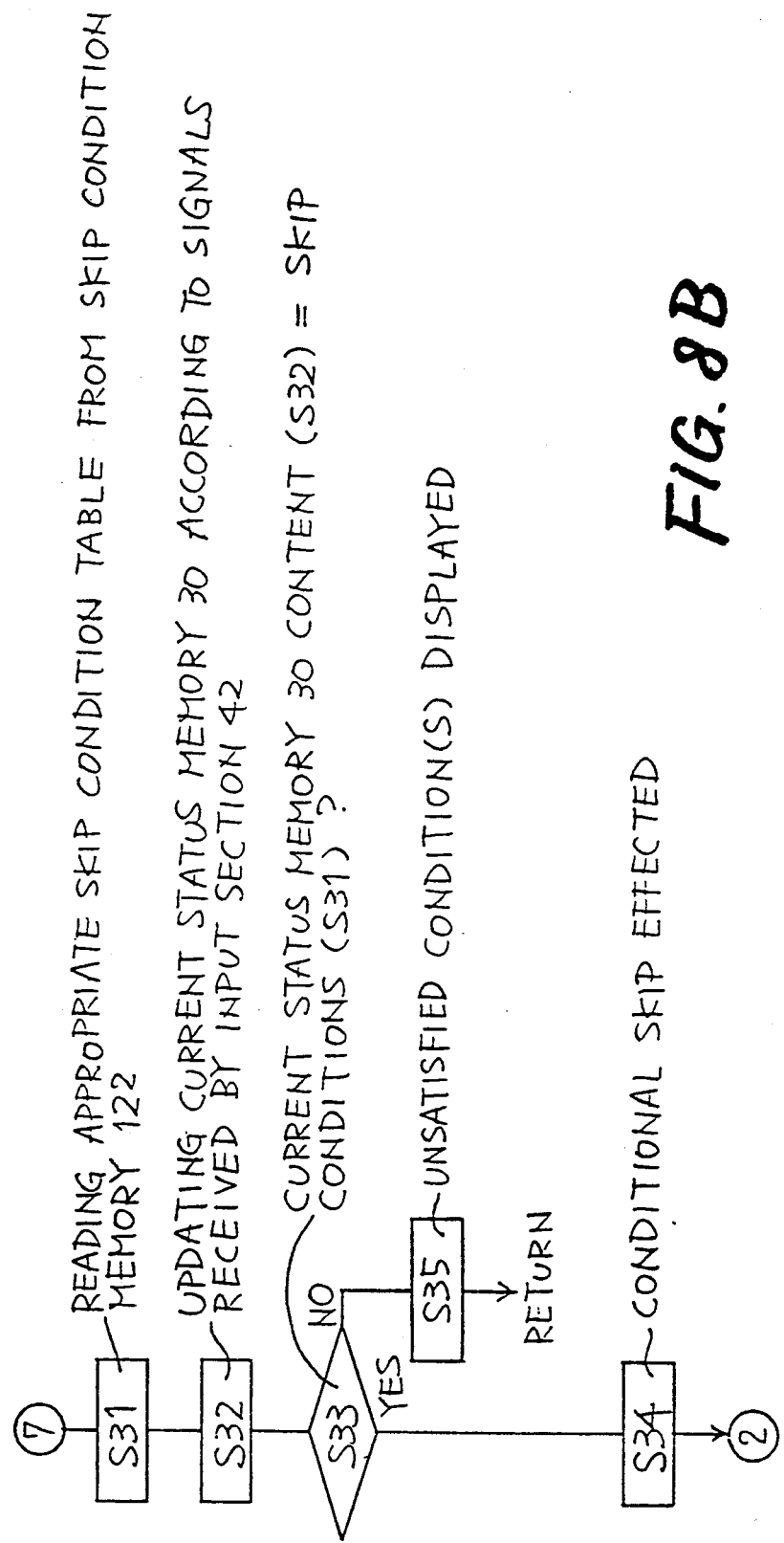

In the flow chart of FIGS. 8A, 8B, step S5 or S28 is followed by step S6 in which are read the operation commands including the skip operation code. The control flow goes via step S7 to step S30 to determine whether the operation commands includes the operation code representative of the conditional skip. If an affirmative decision "YES" is obtained in step S30, step S31 is implemented to read out from the SKIP CONDITION memory 120 one of the skip condition tables which is designated by the most significant digit of the operation commands. The most significant digit represents the number identifying one of the skip condition tables stored in the SKIP CONDITION memory 120. Step S31 is followed by step S32 in which the content of the CURRENT STATUS memory 30 is updated, and the control flow goes to step S33 to determine whether the skip conditions of the relevant skip condition table are satisfied by the current conditions of the CURRENT STATUS memory 30. If the skip conditions are satisfied, step S34 is executed to effect the relevant skip operation, in which the count of the counter 22 is changed to the value designated by the CONDITIONAL SKIP DESIGNATION command. Then, the control flow goes back to step S4. If the skip conditions are not satisfied, the abnormal condition(s) or unsatisfied skip condition(s) is/are indicated on the display 58 in step S35. If a negative decision "NO" is obtained in step S30, step S36 is implemented to effect the other internal processing operation, and step S37 is implemented to determine whether the internal processing operation is completed or not.

In this modified embodiment, only one operation code is required to effect different conditional skip operations whose skip conditions are different. Further, the desired set of skip conditions may be selected for the relevant conditional skip operation, by using the most significant digit of the four-digit operation commands. If the memory capacity of the INTERLOCK CONDITION memory 26 is not entirely used for storing the interlock condition tables, a part of the memory 26 may be used as the SKIP CONDITION memory.

In the illustrated embodiments, only one SEQUENCE memory 24 is used in connection with only one control program stored in the ROM 14, it is possible to provide two more SEQUENCE memories and corresponding control programs to control two or more machines provided in parallel with each other in an automatic machining line. In this case, the control programs are executed according to the contents of the corresponding SEQUENCE counters and based on the operation commands stored in the corresponding SEQUENCE memories, such that the control programs are partly associated with each other, for coordinate operations of the two or more machines. Alternatively, two or more control programs may be used such that one of the control program is used as part of the other control program. In this case, a portion of a series of operations may be repeatedly performed.

It is to be understood that the present invention may be embodied with various other changes, modifications and improvements, which may occur to those skilled in the art, in the light of the foregoing teachings.

What is claimed is:

1. A sequence control apparatus for generating a plurality of sets of operation commands for performing respective events of operation in a predetermined sequence on a controllable device, comprising:
    a counter whose count is changeable by a predetermined incremental or decremental amount;
    sequence memory means having a plurality of memory areas which correspond to respective count values of said counter and which are arranged in the order of said respective count values, said plurality of memory areas storing said plurality of sets of operation commands, respectively;
    interlock condition memory means having a plurality of memory areas corresponding to said respective count values of said counter, said plurality of memory areas storing a plurality of interlock conditions which should be satisfied for said respective events of operation to be performed; and
    control means for changing the count of said counter by said predetermined amount when each of said events of operation is completed, said control means reading out from said sequence memory means one of said sets of operation commands which corresponds to the current count value of said counter, and reading out from said interlock condition memory means one of said interlock conditions which corresponds to said one set of operation commands, said control means determining whether or not said one interlock condition is satisfied on said controllable device, said control means applying said one set of operation commands to said controllable device when said one interlock condition is satisfied, and inhibiting said one set of operation commands from being applied to said controllable device when said one interlock condition is not satisfied.

2. A sequence control apparatus according to claim 1, wherein said sequence memory means is capable of storing, as a part of said operation commands, a conditional skip command for executing a conditional skip operation which consists of changing the count of said counter by an amount other than said predetermined incremental or decremental amount, if a predetermined skip condition is satisfied, and said interlock condition memory means stores skip condition data representative of said predetermined skip condition, and wherein upon reading of said conditional skip command and said predetermined skip condition from said sequence memory means and said interlock condition memory means, said control means determines whether or not said skip condition represented by said skip condition data is satisfied on said controllable device, said control means executing said conditional skip operation if said skip condition is satisfied, and inhibiting said conditional skip operation if said skip condition is not satisfied.

3. A sequence control apparatus according to claim 1, further comprising skip condition memory means for storing skip condition data representative of a skip condition that should be satisfied for a conditional skip operation to be performed, and wherein said sequence memory means is capable of storing as a part of said operation commands, a conditional skip command for executing said conditional skip operation which consists of changing the count of said counter by an amount other than said predetermined incremental or decremental amount,
    upon reading of said conditional skip command and said skip condition data from said sequence memory means and said skip condition memory means, said control means determining whether or not said skip condition represented by said skip condition data is satisfied on said controllable device, said control means executing said conditional skip operation if said skip condition is satisfied, and inhibiting said conditional skip operation if said skip condition is not satisfied.

4. A sequence control apparatus according to claim 1, wherein said sequence memory means is capable of storing as a part of said operation commands an operation interrupt command for interrupting said events of operation on said controllable device, and wherein upon reading of said operation interrupt command, said control means interrupts said events of operation.

5. A sequence control apparatus according to claim 1, further comprising indicator means, responsive to said control means, for indicating said one interlock condition corresponding to the current count of said counter which is not satisfied.

6. A sequence control apparatus according to claim 5, wherein said indicator means comprises a liquid crystal display which provides characters indicative of the interlock condition which is not satisfied on said controllable device.

7. A sequence control apparatus according to claim 5, wherein said controllable device includes a plurality of actuators each of which is activated to perform a corresponding one of said events of operation according to a corresponding one of said plurality of sets of operation commands, said sequence control apparatus further comprising:
    an operator's control unit having a plurality of operator-controlled switches for operating said plurality of actuators, respectively;
    a plurality of indicator lights disposed for said plurality of operator-controlled switches; and
    indicator control means which activates one of said indicator lights which corresponds to one of said operator-controlled switches, when the interlock condition for an event of operation performed by the actuator operated by said one operator-controlled switch is not satisfied, said indicator control means cooperating with said indicator lights to serve as said indicator means.

8. A sequence control apparatus according to claim 1, wherein said controllable device includes a plurality of actuators each of which is activated to perform a corresponding one of said events of operation according to a corresponding one of said plurality of sets of operation commands, said sequence control apparatus further comprising:
- a plurality of indicator lights corresponding to said plurality of actuators, respectively;
- operator-controlled stepping means for sequentially performing said events of operation one at a time each time said operator-controlled stepping means is operated, in at least one of a forward direction determined by a direction in which said events of operation are performed in said predetermined sequence, and a reverse direction opposite to said forward direction; and
- indicator control means for activating one of said indicator lights which corresponds to one of said plurality of actuators which is operated by operation of said operator-controlled stepping means, and thereby informing an operator of the sequence control apparatus of the actuator which is to be operated next.

9. A sequence control apparatus according to claim 8, further comprising an operator's control unit having a plurality of operator-controlled switches for selecting said plurality of actuators, respectively, and wherein said plurality of indicator lights are provided for said plurality of operator-controlled switches, respectively.

10. A sequence control apparatus according to claim 1, wherein said controllable device includes a plurality of actuators each of which is activated to perform a corresponding one of said events of operation according to a corresponding one of said plurality of sets of operation commands, said sequence control apparatus further comprising:
- operator's control unit having plurality of operator-controlled switches for operating said plurality of actuators;
- a plurality of indicator lights corresponding to said plurality of operator-controlled switches;
- first indicator control means for activating one of said indicator lights which corresponds to one of said operator-controlled switches if the interlock condition for the actuator activated by said one operator-controlled switch is not satisfied on said controllable device;
- operator-controlled stepping means for sequentially performing said events of operation one at a time each time said operator-controlled switch is operated, in at least one of a forward direction in which said events of operation are performed in said predetermined sequence, and a reverse direction opposite to said forward direction; and
- second indicator control means for activating one of said indicator lights which corresponds to one of said plurality of actuators which is operated by operation of said operator-controlled stepping means, and thereby informing an operator of and the sequence control apparatus of the actuator which is to be operated next,
- said first and second indicator control means activating said indicator lights in respective different manners.

11. A sequence control apparatus according to claim 1, wherein said controllable device includes a plurality of actuators each of which is activated to perform a corresponding one of said events of operation according to a corresponding one of said plurality of sets of operation commands, said sequence control apparatus further comprising:
- an operator's control unit having operator-controlled stepping means for applying said plurality of sets of operation commands one set at a time to perform said events of operation in said predetermined sequence, said operator's control unit further having indicator means for indicating one of said actuators which is activated next in response to an operation of said operator-controlled stepping means.

12. A sequence control apparatus according to claim 1, wherein said plurality of memory areas of said interlock condition memory means store a plurality of sets of interlock conditions corresponding to said respective events of operation, each of said memory areas consisting of a plurality of memory locations assigned to all operating conditions of said controllable device which cover the interlock conditions of all of said events of operation, each of said memory locations of said each numbered memory area storing data indicative of whether or not the corresponding operating condition of said controllable device should be satisfied for the corresponding event of operation.

13. A sequence control apparatus according to claim 1, further comprising:
- a current status memory which stores current status data indicative of current operating conditions of respective actuators of said controllable device which are activated to perform said events of operation, respectively;
- reset start means, operable while said controllable device is stopped during said events of operation in said predetermined sequence, for re-starting said events of operation from the current operating conditions represented by said current status data stored in said current status memory; and
- reset start control means responsive to said reset start means, for scanning said interlock condition memory means to determine one of said plurality of interlock conditions which coincides with said current operating conditions represented by said current status data, and updating the count of said counter to a value corresponding to the determined one interlock condition.

14. A sequence control apparatus according to claim 1, wherein said controllable device includes a plurality of actuators which are activated to perform said respective events of operation, respectively, and wherein each of said plurality of interlock conditions consists of a start condition that should be satisfied to start a corresponding one of said events of operation, and a continuing condition that should be satisfied for said corresponding one event of operation to continue, said control means including determining means for determining, before starting of said corresponding one event of operation, whether or not said start condition is satisfied, and determining, after said starting, whether or not said continuing condition is satisfied.

15. A sequence control apparatus according to claim 1, wherein said controllable device has a plurality of actuators which are activated to perform said respective events of operation, and each of said plurality of interlock conditions consists of a start condition that should be satisfied to start a corresponding one of said events of operation, and a continuing condition that should be satisfied for said corresponding one event of operation to continue, and wherein each of said plurality of sets of operation commands stored in said sequence memory means includes an auxiliary command indicative of whether or not a plurality of said events of operation should be performed in parallel, said control means including determining means for determining, until all of said plurality of events of operation are started, whether or not the corresponding start conditions are satisfied, and determining, after said all events of operation are started, whether or not the corresponding continuing conditions are satisfied.

16. A sequence control apparatus according to claim 15, wherein each of said plurality of sets of operation commands further includes an operation code representative of a corresponding one of said events of operation, said plurality of memory areas of said sequence memory means including a first group of successive memory areas which store respective sets of operation commands each of which includes said auxiliary command that indicates that events of operation represented by the respective operation codes should be performed in parallel, and a second group of successive memory areas following said first group, said second group of successive memory areas storing respective sets of operation commands which include the respective operation codes and which do not include said auxiliary command that indicates that the events of operation represented by said respective operation codes should be performed in parallel, said operation codes being stored in said second group of successive memory areas in an order in which the corresponding events of operation are completed, said determining means of said control means determining, upon reading of the operation commands from said first group of successive memory areas, whether or not the corresponding start conditions are satisfied, and determining, upon reading of the operation commands from said second group of successive memory areas, whether or not the corresponding continuing conditions are satisfied.

17. A sequence control apparatus according to claim 1, wherein said plurality of sets of operation commands includes a set of operation commands which includes an operation code for effecting a time measuring operation, and a command for designating a length of time to be measured by said time measuring operation.

* * * * *